(12) United States Patent
Palmer

(10) Patent No.: US 8,438,093 B1
(45) Date of Patent: May 7, 2013

(54) METHOD AND SYSTEM FOR CONTRACTING PRODUCER MILK ON A CLASS III BASIS

(75) Inventor: Brian R. Palmer, Wildwood, MO (US)

(73) Assignee: Wells Enterprises, Inc., Le Mars, IA (US)

( * ) Notice: Subject to any disclaimer, the term of this patent is extended or adjusted under 35 U.S.C. 154(b) by 218 days.

(21) Appl. No.: 12/897,865

(22) Filed: Oct. 5, 2010

Related U.S. Application Data

(60) Provisional application No. 61/279,673, filed on Oct. 22, 2009.

(51) Int. Cl.
*G06Q 40/00* (2012.01)

(52) U.S. Cl.
USPC ............... 705/36; 703/11; 705/35; 705/37; 705/38; 705/500; 705/80; 705/4

(58) Field of Classification Search ............... 703/11; 705/26.1, 36, 35, 37, 38, 500, 4, 80
See application file for complete search history.

(56) References Cited

U.S. PATENT DOCUMENTS

| | | | | |
|---|---|---|---|---|
| 7,698,192 | B2 * | 4/2010 | Kiron et al. ............... | 705/36 R |
| 2002/0052795 | A1 * | 5/2002 | Dines et al. ............... | 705/26 |
| 2004/0225536 | A1 * | 11/2004 | Schoen et al. ............. | 705/4 |
| 2006/0277014 | A1 * | 12/2006 | Loder et al. ............... | 703/11 |
| 2007/0162367 | A1 * | 7/2007 | Smith et al. ............... | 705/35 |
| 2007/0219893 | A1 * | 9/2007 | Xu ............................ | 705/36 R |

OTHER PUBLICATIONS

VAs Aim to Hedge Against Interest Rate Risk, Alan Lavine, Annuity Market News, Jul. 1, 2004.*
Effective use of fixed-income pricing models, Anonymous, Bank Systems & Technology, v 33, n 8, p. 20, Aug. 1996.*

* cited by examiner

*Primary Examiner* — Tien Nguyen
(74) *Attorney, Agent, or Firm* — McKee, Voorhees & Sease, P.L.C.

(57) ABSTRACT

A system and method to: Protect the process used to hedge Class II handler milk price exposure and to allow the Class II handler to control the use of the process for its customers, producers, or others who are deemed suitable to the Class II handler and are willing to compensate the Class II handler to utilize the process for their hedging requirements. In one aspect of the invention, the Class II handler will be able to offer to its customers a way to transparently hedge (or set) its milk price as a component of its finished goods cost in a fashion that is correlated in accordance to all FASB and Sarbanes-Oxley financial reporting requirements, and provide a competitive advantage over others. The system and method can be applied in analogous ways to buyers and suppliers of different components used for different finished goods.

16 Claims, 26 Drawing Sheets

| Dates | Class II Price | Class III Price | Rolling 13 Month Correlation |
|---|---|---|---|
| Jan-99 | $ 14.31 | $ 15.84 | |
| Feb-99 | $ 13.73 | $ 11.36 | |
| Mar-99 | $ 13.46 | $ 11.51 | |
| Apr-99 | $ 12.07 | $ 11.64 | |
| May-99 | $ 12.21 | $ 10.91 | |
| Jun-99 | $ 13.85 | $ 11.04 | |
| Jul-99 | $ 13.50 | $ 12.92 | |
| Aug-99 | $ 13.45 | $ 15.61 | |
| Sep-99 | $ 13.29 | $ 15.60 | |
| Oct-99 | $ 12.51 | $ 12.49 | |
| Nov-99 | $ 12.26 | $ 10.58 | |
| Dec-99 | $ 11.65 | $ 9.91 | |
| Jan-00 | $ 11.43 | $ 10.05 | 0.64 |
| Feb-00 | $ 11.50 | $ 9.54 | 0.59 |
| Mar-00 | $ 11.70 | $ 9.54 | 0.69 |
| Apr-00 | $ 12.10 | $ 9.41 | 0.73 |
| May-00 | $ 12.63 | $ 9.37 | 0.70 |
| Jun-00 | $ 13.08 | $ 9.46 | 0.62 |
| Jul-00 | $ 12.58 | $ 10.66 | 0.71 |
| Aug-00 | $ 12.56 | $ 10.13 | 0.67 |
| Sep-00 | $ 12.58 | $ 10.76 | 0.54 |
| Oct-00 | $ 12.54 | $ 10.02 | 0.22 |
| Nov-00 | $ 13.68 | $ 8.57 | (0.28) |
| Dec-00 | $ 13.97 | $ 9.37 | (0.34) |
| Jan-01 | $ 12.82 | $ 9.99 | (0.32) |
| Feb-01 | $ 13.43 | $ 10.27 | (0.19) |
| Mar-01 | $ 14.17 | $ 11.42 | 0.12 |
| Apr-01 | $ 15.10 | $ 12.06 | 0.45 |
| May-01 | $ 15.72 | $ 13.83 | 0.69 |
| Jun-01 | $ 16.05 | $ 15.02 | 0.79 |
| Jul-01 | $ 15.96 | $ 15.46 | 0.83 |
| Aug-01 | $ 15.98 | $ 15.55 | 0.87 |
| Sep-01 | $ 16.24 | $ 15.90 | 0.89 |
| Oct-01 | $ 13.53 | $ 14.60 | 0.81 |
| Nov-01 | $ 12.78 | $ 11.31 | 0.78 |
| Dec-01 | $ 12.61 | $ 11.80 | 0.77 |
| Jan-02 | $ 12.69 | $ 11.87 | 0.80 |

Example Correlation Windows

| 1999-2009 | | |
|---|---|---|
| | II | III |
| II | 1 | |
| III | 0.81795 | 1 |

| 2000-2009 | | |
|---|---|---|
| | II | III |
| II | 1 | |
| III | 0.82643 | 1 |

| 2001-2009 | | |
|---|---|---|
| | II | III |
| II | 1 | |
| III | 0.8561 | 1 |

| 2002-2009 | | |
|---|---|---|
| | II | III |
| II | 1 | |
| III | 0.87598 | 1 |

| 2003-2009 | | |
|---|---|---|
| | II | III |
| II | 1 | |
| III | 0.87622 | 1 |

| 2004-2009 | | |
|---|---|---|
| | II | III |
| II | 1 | |
| III | 0.88231 | 1 |

| 2005-2009 | | |
|---|---|---|
| | II | III |
| II | 1 | |
| III | 0.92066 | 1 |

*FIG. 2A*

| Dates | Class II Price | Class III Price | Rolling 13 Month Correlation |
|---|---|---|---|
| Feb-02 | $ 12.28 | $ 11.63 | 0.78 |
| Mar-02 | $ 12.19 | $ 10.65 | 0.83 |
| Apr-02 | $ 11.88 | $ 10.85 | 0.87 |
| May-02 | $ 11.29 | $ 10.82 | 0.94 |
| Jun-02 | $ 11.19 | $ 10.09 | 0.96 |
| Jul-02 | $ 11.14 | $ 9.33 | 0.96 |
| Aug-02 | $ 11.07 | $ 9.54 | 0.95 |
| Sep-02 | $ 10.91 | $ 9.92 | 0.94 |
| Oct-02 | $ 11.12 | $ 10.72 | 0.88 |
| Nov-02 | $ 11.26 | $ 9.84 | 0.86 |
| Dec-02 | $ 11.62 | $ 9.74 | 0.83 |
| Jan-03 | $ 11.29 | $ 9.78 | 0.79 |
| Feb-03 | $ 10.66 | $ 9.66 | 0.70 |
| Mar-03 | $ 10.54 | $ 9.11 | 0.63 |
| Apr-03 | $ 10.44 | $ 9.41 | 0.62 |
| May-03 | $ 10.43 | $ 9.71 | 0.44 |
| Jun-03 | $ 10.46 | $ 9.75 | 0.36 |
| Jul-03 | $ 10.63 | $ 11.78 | 0.01 |
| Aug-03 | $ 10.81 | $ 13.80 | (0.01) |
| Sep-03 | $ 10.76 | $ 14.30 | (0.03) |
| Oct-03 | $ 10.84 | $ 14.39 | (0.02) |
| Nov-03 | $ 10.98 | $ 13.47 | 0.03 |
| Dec-03 | $ 11.30 | $ 11.87 | 0.13 |
| Jan-04 | $ 11.67 | $ 11.61 | 0.29 |
| Feb-04 | $ 12.90 | $ 11.89 | 0.26 |
| Mar-04 | $ 14.79 | $ 14.49 | 0.43 |
| Apr-04 | $ 15.21 | $ 19.66 | 0.69 |
| May-04 | $ 15.03 | $ 20.58 | 0.77 |
| Jun-04 | $ 14.31 | $ 17.68 | 0.78 |
| Jul-04 | $ 14.00 | $ 14.85 | 0.74 |
| Aug-04 | $ 13.13 | $ 14.04 | 0.70 |
| Sep-04 | $ 13.66 | $ 14.72 | 0.70 |
| Oct-04 | $ 13.56 | $ 14.16 | 0.73 |
| Nov-04 | $ 14.09 | $ 14.89 | 0.78 |
| Dec-04 | $ 13.98 | $ 16.14 | 0.84 |
| Jan-05 | $ 13.04 | $ 14.14 | 0.84 |

Example Correlation Windows

| 2006-2009 | | |
|---|---|---|
| | II | III |
| II | 1 | |
| III | 0.92317 | 1 |

| 2007-2009 | | |
|---|---|---|
| | II | III |
| II | 1 | |
| III | 0.90476 | 1 |

*FIG. 2B*

| Dates | Class II Price | Class III Price | Rolling 13 Month Correlation |
|---|---|---|---|
| Feb-05 | $ 13.36 | $ 14.70 | 0.83 |
| Mar-05 | $ 13.25 | $ 14.08 | 0.80 |
| Apr-05 | $ 13.24 | $ 14.61 | 0.92 |
| May-05 | $ 12.78 | $ 13.77 | 0.88 |
| Jun-05 | $ 13.06 | $ 13.92 | 0.81 |
| Jul-05 | $ 13.79 | $ 14.35 | 0.74 |
| Aug-05 | $ 13.95 | $ 13.60 | 0.51 |
| Sep-05 | $ 14.35 | $ 14.30 | 0.40 |
| Oct-05 | $ 14.25 | $ 14.35 | 0.36 |
| Nov-05 | $ 13.49 | $ 13.35 | 0.35 |
| Dec-05 | $ 13.21 | $ 13.37 | 0.34 |
| Jan-06 | $ 13.25 | $ 13.39 | 0.24 |
| Feb-06 | $ 12.62 | $ 12.20 | 0.50 |
| Mar-06 | $ 11.69 | $ 11.11 | 0.78 |
| Apr-06 | $ 11.37 | $ 10.93 | 0.87 |
| May-06 | $ 11.13 | $ 10.83 | 0.93 |
| Jun-06 | $ 11.00 | $ 11.29 | 0.96 |
| Jul-06 | $ 10.83 | $ 10.92 | 0.97 |
| Aug-06 | $ 11.16 | $ 11.06 | 0.98 |
| Sep-06 | $ 11.74 | $ 12.29 | 0.97 |
| Oct-06 | $ 11.79 | $ 12.32 | 0.95 |
| Nov-06 | $ 11.98 | $ 12.84 | 0.90 |
| Dec-06 | $ 12.55 | $ 13.47 | 0.88 |
| Jan-07 | $ 12.85 | $ 13.56 | 0.89 |
| Feb-07 | $ 13.08 | $ 14.18 | 0.91 |
| Mar-07 | $ 13.60 | $ 15.09 | 0.96 |
| Apr-07 | $ 14.51 | $ 16.09 | 0.99 |
| May-07 | $ 16.62 | $ 17.60 | 0.98 |
| Jun-07 | $ 18.89 | $ 20.17 | 0.99 |
| Jul-07 | $ 21.39 | $ 21.38 | 0.99 |
| Aug-07 | $ 22.41 | $ 19.83 | 0.96 |
| Sep-07 | $ 22.16 | $ 20.07 | 0.96 |
| Oct-07 | $ 21.90 | $ 18.70 | 0.95 |
| Nov-07 | $ 22.07 | $ 19.22 | 0.94 |
| Dec-07 | $ 20.82 | $ 20.61 | 0.93 |
| Jan-08 | $ 19.75 | $ 19.32 | 0.92 |

*FIG. 2C*

| Dates | Class II Price | Class III Price | Rolling 13 Month Correlation |
|---|---|---|---|
| Feb-08 | $ 18.46 | $ 17.03 | 0.89 |
| Mar-08 | $ 15.63 | $ 18.00 | 0.83 |
| Apr-08 | $ 15.29 | $ 16.76 | 0.79 |
| May-08 | $ 15.51 | $ 18.18 | 0.72 |
| Jun-08 | $ 16.19 | $ 20.25 | 0.56 |
| Jul-08 | $ 17.15 | $ 18.28 | 0.60 |
| Aug-08 | $ 17.45 | $ 17.32 | 0.58 |
| Sep-08 | $ 17.58 | $ 16.28 | 0.52 |
| Oct-08 | $ 16.60 | $ 17.06 | 0.46 |
| Nov-08 | $ 14.45 | $ 15.51 | 0.57 |
| Dec-08 | $ 11.21 | $ 15.28 | 0.66 |
| Jan-09 | $ 10.41 | $ 10.78 | 0.74 |
| Feb-09 | $ 10.25 | $ 9.30 | 0.80 |
| Mar-09 | $ 10.35 | $ 10.44 | 0.86 |
| Apr-09 | $ 10.49 | $ 10.78 | 0.88 |
| May-09 | $ 10.71 | $ 9.84 | 0.89 |
| Jun-09 | $ 10.79 | $ 9.97 | 0.89 |
| Jul-09 | $ 10.87 | $ 9.97 | 0.91 |
| Aug-09 | $ 10.86 | $ 11.20 | 0.90 |

| | |
|---|---|
| Cut-Off Correlation Rate | <.85 |
| Number of Times Correlation is Below Cut- | 75 |
| Percent of Time Correlation is Below Cut- | 65% |

*FIG. 2D*

CONTRACT FOR SALE OF MILK

This Contract for Sale of Milk ("Agreement") is entered into by and between company, an entity with its principal place of business located at __ ("Buyer"), and Dairy Farm, an entity with a place of business located at __ (collectively, "Seller").

WHEREAS, Seller desires to sell and Buyer desires to purchase a __ of Seller's milk output, consistent with Seller's historical production volumes, produced by Seller during the term of this Agreement pursuant to the following terms and conditions;

NOW THEREFORE, in exchange for the mutual covenants and promises made herein and other good and valuable consideration, the receipt and sufficiency of which are hereby acknowledged by each party, Buyer and Seller agree as follows:

1. <u>Term</u>. The term of this Agreement shall be __ year(s), commencing on __, and continuing in effect through __. This Agreement may be renewed upon the same terms and conditions herein for an additional term of __ year(s) upon mutual agreement of the parties in writing.

2. <u>Purchased Assets; Quantity</u>. During the term of this Agreement, Seller shall sell to Buyer and Buyer shall purchase from Seller, a __ of the milk output produced by Seller at Seller's facility located at address. Seller shall use commercially reasonable efforts to maintain at such facility a herd of at least __ head of milk cows ("minimum head number") and no more than __ head of milk cows ("maximum head number"). Seller shall provide Buyer with at least __ days prior written notice if the number of milk cows utilized in the production of milk at Seller's location referenced above falls below the minimum head number. Immediately following receipt of such notice and until such time as the number of milk cows used by Seller in the production of milk pursuant to this Agreement meets or exceeds the minimum head number, Buyer shall be entitled to purchase milk to cover any shortfall from an alternate seller(s), and (except in the case of Force Majeure as provided in Paragraph 7(B) Seller shall reimburse Buyer for the difference between the purchase prices of milk produced by Seller and the milk produced by such alternate seller(s) plus any additional costs, losses, and damages (including consequential costs, losses, penalties, fines, and damages) reasonably incurred by Buyer, provided that Buyer has acted in a commercially reasonable manner. The milk purchased by Buyer pursuant to this Agreement shall meet the specifications set forth on Exhibit A, attached hereto and by this reference incorporated herein and made a part hereof, as amended by Buyer from time to time consistent with industry standards ("milk"). Seller shall sell such milk exclusively to Buyer except as expressly permitted otherwise by Buyer's prior written consent.

3. <u>Base Price; Fixed Producer Price Differentials; Price Adjustments</u>.

A. <u>Base Price</u>. The base price for all milk purchased by Buyer from Seller pursuant to this Agreement shall be based on the Class III Milk component prices as announced monthly by the Federal Market Administrator. Except as otherwise provided herein or agreed to by the parties in writing, the parties shall follow the current schedule for payments on the advanced and final settlement dates according to the Central Federal Market Order. The base price shall be adjusted as set forth in this Section 3 and in accordance with the sample calculation set forth in Exhibit B, attached hereto and incorporated herein by this reference. For example only: See Exhibit B, attached hereto and incorporated herein by this reference.

*FIG.4A*

B. <u>Fixed Producer Price Differentials</u>. In addition to the base price set forth in Paragraph 3(A) above, Buyer shall pay Seller a fixed producer price differential ("Fixed PPD") as follows:

(1) For the __ months of this Agreement, the Fixed PPD shall be established at __ per hundred weight (__/cwt). For purposes of this Agreement, "hundred weight" or "cwt" shall mean one hundred (100) pounds of raw milk weight; or (2) In the event this Agreement is renewed for an additional period of __ year(s) following the initial term, then for such period of this Agreement (and each __ period thereafter, if this Agreement is subsequently renewed), the Fixed PPD shall be established to reflect the average producer price differential of __ months. The new annual Fixed PPD will be set by calculating the simple average of the monthly producer price differential as set forth by the Federal Market Administrator for Central Order No. __ ("FMA"), as announced and published monthly in the <u>Official Announcements of Class and Producer Prices</u> for the __ year(s) including __ (for __), less the difference in location differential for __.

C. <u>Price Adjustments</u>. In addition to the base price and applicable Fixed PPD in Paragraphs 3(A) and 3(B) above, the price shall be adjusted as follows:

(1) Buyer shall pay Seller a fixed premium of __ per hundred weight (__/cwt); and (2) Buyer shall deduct from the price a __ charge of __ per hundred weight (__/cwt) for all milk delivered between __ and __. On or before __ and each __ thereafter during the term of this Agreement and any renewal term, the parties shall negotiate in good faith and mutually agree upon any adjustment to the cost of __ to be deducted by Buyer for all milk delivered commencing __ and each respective __ thereafter. Such adjustment, if any, shall be based on actual cost increases verified by Buyer to Seller. At no time shall such __ charge exceed then-current costs of __. For clarification, such __ costs shall be firm for each __ period from each __ through the immediately following __ during the term of this Agreement.

4. <u>Tests, Weights, and Delivery</u>.

A. In the event Seller's milk is unsaleable because of antibiotic residue detected on the farm prior to the delivery of the milk to Buyer, and the milk is dumped on the farm, Buyer will, __, reimburse Seller for __ of the value of __ milk dumped on the farm.

B. Seller shall deliver all milk to Buyer at Seller's sole cost, which cost shall not exceed the amount specified in Paragraph 3(C)(2) of this Agreement. Buyer shall deduct for __ charges pursuant to Paragraph 3(C)(2) above. Acceptance of the purchased milk by Buyer at Buyer's plant shall constitute completed delivery.

5. <u>Date of Payment</u>. An estimated payment for __ of milk delivered __ shall be made to Seller on or before the __ day of such month, and payment of the remaining balance of all milk actually delivered during __ shall be made on or before the __ day of the following month.

6. <u>Cryoscope Test</u>. A cryoscope test may be performed on any milk purchased by Buyer under this Agreement. If the test results reveal __, adjustments to weights and tests will be made as follows:

*FIG.4B*

A. The pounds of butterfat received shall be ascertained by __ the recorded weight by the actual butterfat test. The actual weight received shall be determined by __ computed from a cryoscope base of __;

B. The butterfat adjustment shall be computed by __ the actual pounds of fat by the __ milk received; and C. The adjusted load weight and butterfat test will become the basis for settlement.

7. Indemnification and Force Majeure.

A. Seller agrees to indemnify and hold Buyer harmless for any damages, losses, liabilities, costs, and expenses Seller may incur, including but not limited to attorney's fees and costs of litigation and damages caused by, attributable to, or arising in connection with (i) the performance, non-performance, or delayed performance of Seller contemplated by this Agreement, or (ii) the breach of any of Seller's warranties under this Agreement whether negligent or otherwise.

B. Neither Seller nor Buyer will be liable for any failure to perform or any delay in the performance of its obligations hereunder due to Force Majeure. Force Majeure means any event or condition, not existing as of the date of this Agreement, not reasonably foreseeable as of such date and not reasonably within the control of Seller or Buyer which prevents, in whole or in material part, the performance by Buyer or Seller of its obligations hereunder or which renders the performance of such obligations so difficult or costly as to make such performance commercially unreasonable. Mere changes to market conditions shall not constitute a Force Majeure event. Without limiting the foregoing, the following will constitute events or conditions of Force Majeure: herd disease that results notwithstanding Seller's maintenance and care of its herd consistent with modern animal husbandry practices, riots, civil disturbances, strikes, lockouts, boycotts, picketing or other industrial disturbances, declared or undeclared war, military actions, police actions, blockades, embargoes, insurrections, delays of carrier, acts of God or government, fire, ice storm, flood, hurricane, typhoon, tornado, earthquake, lightning and explosion.

8. Failure to Deliver. Except in the case of Force Majeure as provided in Paragraph 7(B), in the event Seller fails to deliver Seller's total milk output to Buyer or Seller is otherwise in breach of this Agreement, Seller authorizes Buyer to acquire __ of milk from alternative sources and Seller shall pay and indemnify Buyer for any reasonable cost, loss and damage (including consequential costs, losses, penalties, fines and damages) that Buyer may sustain thereby and any premiums that Buyer reasonably may be required to pay thereon, and for any reasonable cost, loss and damages (including consequential costs, losses, penalties, fines and damages) that Buyer may sustain as a result of Seller's breach hereunder, from its inability to acquire __ of milk from alternative sources, provided that Buyer shall be required to act in a commercially reasonable manner.

9. Termination. In the event either party materially breaches any of its obligations pursuant to this Agreement, and such breach is continuing and remains uncured within __ days following written notice from the non-breaching party, the non-breaching party may terminate this Agreement immediately upon written notice to the breaching party.

10. Limitation of Liability. Notwithstanding anything herein to the contrary, Seller's liability to Buyer for Seller's breach of Paragraphs 7 or 8 herein shall not exceed __ per occurrence.

*FIG.4C*

11. Assignment and Severability. This Agreement may be assigned by Buyer with Seller's prior written consent, such consent not to be unreasonably withheld. In the event of such assignment, Buyer shall no longer be obligated under this Agreement for purchases made following the date of the Assignment. In the event that any of the terms or provisions of this Agreement are in conflict with any rule of law or statutory provision or are otherwise unenforceable under the laws or regulations of any government or subdivision thereof having jurisdiction over this Agreement, such terms or provisions will be deemed stricken from this Agreement to the extent necessary to avoid such conflict, but such invalidity or unenforceability will not invalidate any of the other terms or provisions of this Agreement and the remainder of such terms or provisions and the remainder of this Agreement will continue in full force and effect, unless the invalidity or unenforceability of any such provisions hereof does substantial violence to, or where the invalid or unenforceable provisions comprise an integral part of, or are otherwise inseparable from the remainder of this Agreement.

12. Waiver. The course of dealing or course of performance between Seller and Buyer shall not operate as a waiver of any rights of any of them under this Agreement, or under any other agreement between any of them. No failure or delay by and part to take any action or assert any right or remedy hereunder, or to enforce strict compliance with any provision hereof, will be deemed to be a waiver of, or estoppel, with respect to, such right, remedy or noncompliance in the event of the continuation or repetition of the circumstances giving rise to such right, remedy or noncompliance. No waiver will be effective unless given in a duly executed written instrument.

13. Governing Law; Venue. This Agreement and the legal relations between the parties hereto will be governed by and construed in accordance with the internal laws of the State (without regard to the laws of conflict of any jurisdiction). The immediately prior sentence not withstanding, any state imposed Quality Standards shall be those of the state of Seller's farm location at which the milk is delivered. The District Court in and for County shall have exclusive jurisdiction over any disputes arising out of this Agreement, and each party hereby consents to submit to the personal jurisdiction of such Court.

14. Representations and Warranties of Seller.

A. Quality Standards. Seller represents and warrants that all milk delivered to Buyer shall meet all applicable health and sanitation requirements of the state and federal agencies having jurisdiction over said milk or any part thereof, including regulations of the USDA, FDA and the requirements of the Federal Food, Drug, and Cosmetic Act and regulations thereunder and the applicable requirements for a permit and, in addition thereto, such additional quality standards as may be reasonably required by Buyer as a purchaser of the milk and consistent with industry standards (hereinafter collectively "Quality Standards"). Buyer's Quality Standards may be changed from time to time by Buyer in its reasonable discretion. Seller further represents and warrants that it is in compliance and shall remain in compliance in all respects with all laws, statutes, ordinances, rules, regulations, notices, approvals and orders (including without limitation, those relating to environmental protection, conservation, hazardous or toxic substances, pollutants, materials, wastes or contaminates or other environmental matters) which have any applicability or relevance to the milk or to the business and operation of Seller.

B. Organization; Good Standing; Qualification; and Power. If Seller is a corporation, it is duly incorporated, validly existing and in good standing under the laws of the state of its incorporation, has all requisite corporate power and authority to operate its business as it is now being conducted, to enter into this Agreement, to perform its

*FIG.4D* obligations hereunder, and to consummate the transactions contemplated hereby. If Seller is a limited liability company, it is duly organized, validly existing and in good standing under the laws of the state of its organization, has all requisite limited liability company power and authority to operate its business as it is now being conducted, to enter into this Agreement, to perform its obligations hereunder, and to consummate the transactions contemplated hereby. If Seller is a partnership, it is duly organized, validly existing and in good standing under the laws of the state of its formation, has all requisite power and authority to operate its business as it is now being conducted, to enter into this Agreement, to perform its obligations hereunder, and to consummate the transactions contemplated hereby.

C.    <u>Authority; No Violation</u>. The execution and delivery of this Agreement and the consummation of the transactions contemplated hereby have been duly and validly authorized by all necessary action on the part of Seller, including any necessary shareholder, member or partner approval, and this Agreement is the valid and binding obligation of Seller enforceable in accordance with its terms. Each party hereby represents and warrants it has caused its duly authorized representative to execute this Agreement on such party's behalf and no additional signature(s) are necessary to bind the respective party hereto. Neither the execution and delivery of this Agreement, nor the consummation of the transactions contemplated herein, nor compliance by Seller with any of the provisions hereof will violate, or result in the breach of, any instrument or statute to which Seller is a party or to which Seller is bound.

D.    <u>Title to Property; Condition of Milk</u>. Seller has good and marketable title to milk sold to Buyer pursuant to this Agreement and such milk is and shall be free and clear of all liens and encumbrances of any kind or character.

E.    <u>Litigation</u>. There are no actions, suits, claims, investigations or legal, administrative, or arbitration proceedings pending or threatened against Seller relating to the purchased assets, whether at law or in equity nor is there any basis for any such litigation, proceeding or governmental investigation relating to the milk.

F.    <u>Survival of Representations and Warranties</u>. All of the representations, warranties and covenants of Seller shall survive the termination of this Agreement.

15.    <u>Removal of Bovine Somatotropin</u>. In the event Buyer requires Seller to remove bovine somatotropin ("rBST") from Seller's milk at any time from __ through __, Buyer shall give Seller at least __ and no more than __ months prior written notice of such requirement, and Seller shall fully comply with such requirement within such notice period. Buyer shall pay Seller an additional premium of __ per hundred weight (__/cwt) for all milk delivered to Buyer by Seller commencing __ months immediately following the date of such notice. Commencing __ months immediately following the date of such notice, Buyer shall pay Seller an additional premium of __ per hundred weight (__/cwt), resulting in a total premium of __ per hundred weight (__/cwt), for all milk delivered by Seller to Buyer. Commencing __ months immediately following the date of such notice, Buyer shall pay Seller an additional premium of __ per hundred weight (__/cwt), resulting in a total premium of __ per hundred weight (__/cwt), for milk delivered by Seller to Buyer. Such premium shall be paid until the earlier of the following: (a) Buyer's receipt of an affidavit executed by Seller and acceptable to Buyer in its discretion, certifying that all of Seller's milk is and shall be rBST free (Buyer shall provide Seller with a form affidavit for Seller's execution), or (b) the expiration of __ months immediately following Buyer's written notice to Seller, referenced above, requiring Seller to remove rBST from Seller's milk. Upon receipt of such affidavit executed by Seller, Buyer shall pay Seller a premium of __ per hundred weight (__/cwt) in lieu of the total premium of __ per hundred weight (__/cwt) for all milk delivered by Seller to

*FIG.4E*

Buyer through the immediately following __. For clarification, if Seller fails to provide Buyer with such affidavit executed by Seller within __ months immediately following the aforementioned notice, Seller shall be in breach of this Agreement.

On or before __, and each __ thereafter during the term of this Agreement and each renewal term, if any, Buyer and Seller shall negotiate in good faith and mutually agree in writing upon the premium, if any, to be paid by Buyer for delivery of rBST free milk requested by Buyer. Such premium, if any, shall be consistent with the then-current industry market standard for such premiums and shall be in effect commencing the immediately following __ for a period of __. For purposes of clarification and notwithstanding anything herein to the contrary, any premium paid by Buyer in connection with Seller's commencement or continuation of delivery of rBST free milk after __ months of this Agreement, if any, shall be mutually agreed upon by the parties in writing.

> For example only, in the event Buyer requests Seller remove rBST from Seller's milk on __, Buyer shall pay Seller a premium of __ per hundred weight (__/cwt) for all milk delivered by Seller to Buyer commencing __. Commencing __, such premium shall __ by __ per hundred weight (__/cwt). Commencing __, such premium shall __ by __ per hundred weight (__/cwt) for milk delivered by Seller to Buyer. Upon receipt of Seller's affidavit (prepared by Buyer and executed by Seller), certifying Seller's milk is rBST free, Buyer shall pay Seller a total premium of __ per hundred weight (__/cwt) for such rBST free milk through __. If Seller fails to execute such affidavit and provide it to Buyer on or before __, Seller shall be in breach of this Agreement. On or before __, the parties would negotiate the premium, if any, to be paid for rBST free milk in the renewal period, if any, commencing __.

16. <u>Further Assurances</u>. Each party to this Agreement will perform such acts, and execute and deliver to the other party such additional documents or instruments as may be reasonably requested in order to effect the terms of and purposes of this Agreement. Seller shall further cooperate with Buyer with respect to such USDA programs as may be available and as the parties may reasonably agree in good faith from time to time. Seller presently appoints any officer or employee of Buyer as Seller's limited attorney-in-fact for the sole purpose of taking the following actions to effectuate milk pricing deductions required by law and otherwise consistent with industry standards – endorsing or placing Seller's name on invoices, documents of title, checks, drafts, insurance claims or payments or other documents evidencing payment for the milk or enrollment in such USDA programs as the parties may reasonably agree in good faith from time to time. Except for Buyer's gross negligence or willful misconduct, all acts by Buyer pursuant to this paragraph are ratified and approved and Buyer shall not be liable for any acts or omissions, nor any errors of judgment or mistakes of fact or law.

17. <u>Set-Off</u>. Buyer shall have the right to set off any amounts owed by Buyer to Seller pursuant to this Agreement to the extent of any reasonably undisputed amounts owed and due and payable by Seller to Buyer. Such right of set off shall be in addition to any and all other remedies available to Buyer in equity and at law.

*FIG.4F*

18. <u>Adequate Assurance</u>. Without in any way modifying or expanding either party's rights or obligations thereunder, the parties hereto acknowledge and agree that either party shall have the right, pursuant to and as provided in __, to demand adequate assurance of the other party's due performance hereunder in the event the demanding party has reasonable grounds for insecurity as to the other party's performance.

19. <u>Notices</u>. Any notice required herein shall be made by the respective parties by U.S. Mail or hand-delivery as follows:

| | |
|---|---|
| If to Buyer: | Company<br>Address<br>Attn: |
| With a copy to: | Company<br>Address<br>Attn: |
| If to Seller: | Dairy Farm<br>Address |

20. <u>Confidentiality</u>. The parties have entered into a Confidentiality Agreement, a copy of which is attached hereto as Exhibit C and, by this reference, is made a part hereof.

21. <u>Relationship</u>. Seller is not an agent, franchisee, partner or joint venturer of Buyer. Seller is not authorized to enter into or execute any contract, order, or other commitment and will have no authority to otherwise obligate Buyer.

22. <u>Insurance</u>. During the term of this Agreement and for a period of __ years thereafter, Seller shall pay for and maintain General Commercial Liability insurance coverage with policy limits of __ , and worker's compensation insurance coverage as required by the applicable state statute(s). Seller shall cause Buyer to be named as an additional insured on such liability insurance policy. All insurance policies shall be with companies reasonably acceptable to Buyer. Seller shall give Buyer at least __ days prior written notice of any changes or cancellation in such coverage.

23. <u>Disclosure Statement</u>. Seller has executed a Disclosure Statement, attached hereto as Exhibit E and, by this reference, incorporated herein and made a part hereof.

24. <u>Headings; Cumulative Remedies; Entire Agreement; Modification; Binding Effect</u>.
The headings in this Agreement are inserted for purposes of convenience only and shall not be used in construing the meaning of any provision herein. The rights and remedies of the parties in this Agreement are cumulative and not alternative. This Agreement states the entire agreement between the parties relating to the subject matter hereof during the period specified and all prior or contemporaneous oral or written statements are hereby excluded. This Agreement may only be amended by written agreement of all parties. This Agreement shall inure to the benefit of and shall be binding upon the parties and their respective permitted successors, assigns, heirs, and legal representatives.

*FIG.4G*

IN WITNESS WHEREOF, each party has caused its duly authorized representative to execute this Agreement on such party's behalf as of the date(s) below.

Dairy Farm,                                    Company

By: _____                By: _____

Date:_____                Date: _____

By: _____

Date: _____

*FIG.4H*

EXHIBIT A
Ingredient Specification Sheet
Product: Milk,

Date Created: 00-00-0000  Date Revised: 00-00-0000
Approval Date: 00-00-0000  Version:

PRODUCT DESCRIPTION:
  This product shall be the lacteal secretion, practically free from colostrum, that is obtained by the complete milking of one or more healthy cows. This product shall be light cream to white in color with a clean flavor and free of foreign flavors and odors. This product shall contain no additives or neutralizing agents.

INGREDIENTS:
  Milk

ALLERGENS:
  This product shall not contain any other allergens except milk.

PRODUCT CHARACTERISTICS:

| Attribute COA | Specification | Methodology | |
|---|---|---|---|
| Color | Light cream to white | Visual | No |
| Flavor | Fresh, clean | Organoleptic | No |
| Fat | 3.25% minimum (w/w) | AOAC Approved | No |
|  | Total Solids | 11.5% minimum (w/w) | AOAC Approved |
|  | No |  |  |
| Titratable Acidity | 0.09 - 0.14% Lactic acid (w/v) | AOAC Approved | No |
| Antibiotic Residues | Negative | AOAC Approved | No |

MICROBIOLOGICAL CHARACTERISTICS:

| Attribute COA | Specification | Methodology | |
|---|---|---|---|
| Producer: |  |  |  |
| Standard Plate Count | <100000 CFU/g | AOAC Approved | No |
| Somatic Cell Count | <750000 CFU/mL | AOAC Approved | No |
| Commingled |  |  |  |
| Standard Plate Count | <300000 CFU/g | AOAC Approved | No |

REQUIREMENTS FOR RECEIPT OF MILK:

| Attribute | Specification |
|---|---|
| Temperature | Cooled to 50°F (10°C) or less within four (4) hours or less, of the commencement of the first milking, and to 45°F (7°C) or less within two (2) hours after the completion of milking. Provided, that the blend temperature after the first milking and subsequent milkings does not exceed 50°F (10°C) |
| Antibiotic Residues | Negative |
| Titratable Acidity | 0.09 – 0.14% Lactic acid (w/v) |
| Odor | No off-odors |
| Color | Light cream to white |
| Flavor | Fresh, clean |
| Seals | Intact |
| Wash Tags | Current |

PACKAGING:
  This product shall be received in bulk.

*FIG.4I*

TRANSPORTATION:
Tankers must be food grade only and be dedicated for their particular use. They must comply with all FDA, USDA and PMO regulations pertaining to bulk tankers. Tankers delivering bulk ingredients will be transported and received under seal with the seal numbers recorded on the appropriate load documentation. In addition a wash ticket must be attached listing the last product transferred prior to the wash.

STORAGE AND SHELF LIFE:
This product should be stored and maintained at less than 45°F.

LABELING REQUIREMENTS:
Numeric data will need to be available in a bar code format
Manufacturers Name
Full Product Description and Manufacturers Item Number
Wells Item Number (Example: WBB-12345)
Time of Production
Lot Code, Date of Manufacture, Expiration or "Use By" Date
Quantity per lot
Unit of Measure
Case weight
License Plate Number
GMA New Pallet (Hardwood) 40 x 48, 4-way entry
Temperature at Receiving
Recommended Storage Conditions, Tempering Instructions, if applicable
Ingredient Listing
Kosher Symbol, if applicable
Hazardous Notations: Flash point, UN Number INDEMNITY AGREEMENT:
The Product supplied, shipped and/or delivered to Wells is (a) free from defects in design, workmanship, and/or materials, including, without limitation, such defects as could create a hazard to life or property; (b) not adulterated or misbranded within the meaning of the Federal Food, Drug and Cosmetic Act of 1938, as amended, (hereinafter the "FDCA"); (c) not an article which cannot be introduced into interstate commerce under the provisions of Sections 301, 404 and 505 of the FDCA, or any successor thereto; (d) manufactured, stored, and delivered in accordance with appropriate "Good Manufacturing Practices" under the FDCA or comparable regulations of the USDA; (e) in compliance with all applicable federal, state, agency, and local laws, ordinances, and regulations; (f) of good and merchantable quality and shall pass without valid objection in trade; (g) fit for the Product's particular purpose of human consumption and use in the manufacture of ice cream, frozen novelties, and other food products produced by Wells, and in strict accordance with Wells' specifications; (h) does not contain pathogenic micro-organisms if the product is a "ready to eat" food product that does not require cooking for safety; and (i) not produced, harvested, manufactured, assembled, or delivered by illegal child, forced, prison, or undocumented worker (illegal alien) labor. Product supplied must also be in compliance with the Wells' Dairy Inc. Supplier Food Safety Information Questionnaire.

APPROVALS:

R & D:_____
Date:_____

QA:_____
Date:_____

Purchasing:_____
Date:_____

Supplier:_____
Date:_____

*FIG.4J*

EXHIBIT B
PRICING EXAMPLE

| DAIRY FARM NO. 1 PAY STRUCTURE UNDER FORWARD CONTRACT |||||||||||
|---|---|---|---|---|---|---|---|---|---|---|
| Month | JAN '-- | FEB '-- | MAR '-- | APR '-- | MAY '-- | JUN '-- | JUL '-- | AUG '-- | SEP '-- | OCT '-- | ADJ |
| Product Pounds | lbs | lbs | lbs | lbs | lbs | lbs | lbs | lbs | lbs | lbs | |
| BF Price/lb | $ - | $ - | $ - | $ - | $ - | $ - | $ - | $ - | $ - | $ - | |
| BF Pounds | lbs | lbs | lbs | lbs | lbs | lbs | lbs | lbs | lbs | lbs | |
| BF Amount | $ - | $ - | $ - | $ - | $ - | $ - | $ - | $ - | $ - | $ - | $ - |
| Protein Price/lb | $ - | $ - | $ - | $ - | $ - | $ - | $ - | $ - | $ - | $ - | |
| Protein Pounds | lbs | lbs | lbs | lbs | lbs | lbs | lbs | lbs | lbs | lbs | |
| Protein Amount | $ - | $ - | $ - | $ - | $ - | $ - | $ - | $ - | $ - | $ - | $ - |
| OTS Price/lb | $ - | $ - | $ - | $ - | $ - | $ - | $ - | $ - | $ - | $ - | |
| OTS Pounds | lbs | lbs | lbs | lbs | lbs | lbs | lbs | lbs | lbs | lbs | |
| OTS Amount | $ - | $ - | $ - | $ - | $ - | $ - | $ - | $ - | $ - | $ - | $ - |
| Fixed PPD (FPPD) | $ - | $ - | $ - | $ - | $ - | $ - | $ - | $ - | $ - | $ - | $ - |
| PPD Amount | $ - | $ - | $ - | $ - | $ - | $ - | $ - | $ - | $ - | $ - | $ - |
| Premium/cwt | $ - | $ - | $ - | $ - | $ - | $ - | $ - | $ - | $ - | $ - | $ - |
| Premium Pay | $ - | $ - | $ - | $ - | $ - | $ - | $ - | $ - | $ - | $ - | |
| Subtotal | $ - | $ - | $ - | $ - | $ - | $ - | $ - | $ - | $ - | $ - | |
| Hauling Price/cwt | $ - | $ - | $ - | $ - | $ - | $ - | $ - | $ - | $ - | $ - | $ - |
| Hauling Amount | $ - | $ - | $ - | $ - | $ - | $ - | $ - | $ - | $ - | $ - | $ - |
| Farm Purchases | $ - | $ - | $ - | $ - | $ - | $ - | $ - | $ - | $ - | $ - | |
| Dues Fees (State) | $ - | $ - | $ - | $ - | $ - | $ - | $ - | $ - | $ - | $ - | |
| Dairy Promotions (State) | $ - | $ - | $ - | $ - | $ - | $ - | $ - | $ - | $ - | $ - | |
| Dairy Collections (National) | $ - | $ - | $ - | $ - | $ - | $ - | $ - | $ - | $ - | $ - | |
| Misc. Assignments | $ - | $ - | $ - | $ - | $ - | $ - | $ - | $ - | $ - | $ - | |
| Monthly Pay | $ - | $ - | $ - | $ - | $ - | $ - | $ - | $ - | $ - | $ - | $ - |

FIG. 4K

EXHIBIT C

Confidentiality Agreement

*FIG.4L*

| Year | Month | Order Number | Producer Price Differential | County Adjustment |
|---|---|---|---|---|
| 2000 | 01 | 32 | 1.18 | 0.93 |
| 2000 | 02 | 32 | 1.46 | 1.21 |
| 2000 | 03 | 32 | 1.37 | 1.12 |
| 2000 | 04 | 32 | 1.43 | 1.18 |
| 2000 | 05 | 32 | 1.59 | 1.34 |
| 2000 | 06 | 32 | 1.7 | 1.45 |
| 2000 | 07 | 32 | 1.29 | 1.04 |
| 2000 | 08 | 32 | 1.48 | 1.23 |
| 2000 | 09 | 32 | 1.21 | 0.96 |
| 2000 | 10 | 32 | 1.38 | 1.13 |
| 2000 | 11 | 32 | 2.28 | 2.03 |
| 2000 | 12 | 32 | 2.01 | 1.76 |
| 2000 Average | | | 1.531666667 | 1.28166667 |
| 2001 | 01 | 32 | 1.86 | 1.61 |
| 2001 | 02 | 32 | 1.55 | 1.3 |
| 2001 | 03 | 32 | 1.32 | 1.07 |
| 2001 | 04 | 32 | 1.36 | 1.11 |
| 2001 | 05 | 32 | 0.97 | 0.72 |
| 2001 | 06 | 32 | 0.77 | 0.52 |
| 2001 | 07 | 32 | 0.68 | 0.43 |
| 2001 | 08 | 32 | 0.74 | 0.49 |
| 2001 | 09 | 32 | 0.66 | 0.41 |
| 2001 | 10 | 32 | 0.32 | 0.07 |
| 2001 | 11 | 32 | 1.86 | 1.61 |
| 2001 | 12 | 32 | 0.66 | 0.41 |
| 2001 Average | | | 1.0625 | 0.8125 |
| 2002 | 01 | 32 | 0.74 | 0.49 |
| 2002 | 02 | 32 | 0.69 | 0.44 |
| 2002 | 03 | 32 | 1.01 | 0.76 |
| 2002 | 04 | 32 | 0.83 | 0.58 |
| 2002 | 05 | 32 | 0.65 | 0.4 |
| 2002 | 06 | 32 | 0.91 | 0.66 |
| 2002 | 07 | 32 | 1.11 | 0.86 |
| 2002 | 08 | 32 | 1.04 | 0.79 |
| 2002 | 09 | 32 | 0.82 | 0.57 |
| 2002 | 10 | 32 | 0.46 | 0.21 |
| 2002 | 11 | 32 | 0.9 | 0.65 |
| 2002 | 12 | 32 | 0.93 | 0.68 |
| 2002 Average | | | 0.840833333 | 0.59083333 |

*FIG. 5A*

| Year | Month | Order Number | Producer Price Differential | County Adjustment |
|---|---|---|---|---|
| 2003 | 01 | 32 | 0.89 | 0.64 |
| 2003 | 02 | 32 | 0.75 | 0.5 |
| 2003 | 03 | 32 | 0.97 | 0.72 |
| 2003 | 04 | 32 | 0.81 | 0.56 |
| 2003 | 05 | 32 | 0.7 | 0.45 |
| 2003 | 06 | 32 | 0.69 | 0.44 |
| 2003 | 07 | 32 | -0.29 | -0.54 |
| 2003 | 08 | 32 | -1.28 | -1.53 |
| 2003 | 09 | 32 | -0.38 | -0.63 |
| 2003 | 10 | 32 | -0.16 | -0.41 |
| 2003 | 11 | 32 | 0.2 | -0.05 |
| 2003 | 12 | 32 | 1.04 | 0.79 |
| 2003 Average | | | 0.328333333 | 0.07833333 |
| 2004 | 01 | 32 | 0.69 | 0.44 |
| 2004 | 02 | 32 | 0.77 | 0.52 |
| 2004 | 03 | 32 | 0.14 | -0.11 |
| 2004 | 04 | 32 | -4.02 | -4.27 |
| 2004 | 05 | 32 | -2.18 | -2.43 |
| 2004 | 06 | 32 | 0.55 | 0.3 |
| 2004 | 07 | 32 | 1.18 | 0.93 |
| 2004 | 08 | 32 | 0.42 | 0.17 |
| 2004 | 09 | 32 | 0.21 | -0.04 |
| 2004 | 10 | 32 | 0.54 | 0.29 |
| 2004 | 11 | 32 | 0.21 | -0.04 |
| 2004 | 12 | 32 | -0.88 | -1.13 |
| 2004 Average | | | -0.1975 | -0.4475 |
| 2005 | 01 | 32 | 0.81 | 0.56 |
| 2005 | 02 | 32 | -0.2 | -0.45 |
| 2005 | 03 | 32 | 0.65 | 0.4 |
| 2005 | 04 | 32 | -0.02 | -0.27 |
| 2005 | 05 | 32 | 0.44 | 0.19 |
| 2005 | 06 | 32 | 0.26 | 0.01 |
| 2005 | 07 | 32 | 0.41 | 0.16 |
| 2005 | 08 | 32 | 0.89 | 0.64 |
| 2005 | 09 | 32 | 0.45 | 0.2 |
| 2005 | 10 | 32 | 0.35 | 0.1 |
| 2005 | 11 | 32 | 0.71 | 0.46 |
| 2005 | 12 | 32 | 0.32 | 0.07 |
| 2005 Average | | | 0.4225 | 0.1725 |

*FIG. 5B*

| Year | Month | Order Number | Producer Price Differential ($ per cwt.) | County Adjustment |
|---|---|---|---|---|
| 2006 | 01 | 32 | 0.36 | 0.11 |
| 2006 | 02 | 32 | 0.71 | 0.46 |
| 2006 | 03 | 32 | 0.89 | 0.64 |
| 2006 | 04 | 32 | 0.56 | 0.31 |
| 2006 | 05 | 32 | 0.59 | 0.34 |
| 2006 | 06 | 32 | 0.33 | 0.08 |
| 2006 | 07 | 32 | 0.61 | 0.36 |
| 2006 | 08 | 32 | 0.68 | 0.43 |
| 2006 | 09 | 32 | -0.06 | -0.31 |
| 2006 | 10 | 32 | 0.41 | 0.16 |
| 2006 | 11 | 32 | 0.12 | -0.13 |
| 2006 | 12 | 32 | -0.15 | -0.4 |
| 2006 Average | | | 0.420833333 | 0.17083333 |
| 2007 | 01 | 32 | 0.36 | 0.11 |
| 2007 | 02 | 32 | -0.12 | -0.37 |
| 2007 | 03 | 32 | -0.15 | -0.4 |
| 2007 | 04 | 32 | -0.11 | -0.36 |
| 2007 | 05 | 32 | -0.1 | -0.35 |
| 2007 | 06 | 32 | -0.37 | -0.62 |
| 2007 | 07 | 32 | 0.52 | 0.27 |
| 2007 | 08 | 32 | 2.1 | 1.85 |
| 2007 | 09 | 32 | 1.59 | 1.34 |
| 2007 | 10 | 32 | 2.12 | 1.87 |
| 2007 | 11 | 32 | 1.57 | 1.32 |
| 2007 | 12 | 32 | -0.24 | -0.49 |
| 2007 Average | | | 0.5975 | 0.3475 |
| 2008 | 01 | 32 | 0.39 | 0.14 |
| 2008 | 02 | 32 | 1.08 | 0.83 |
| 2008 | 03 | 32 | -1.15 | -1.4 |
| 2008 | 04 | 32 | 0.72 | 0.47 |
| 2008 | 05 | 32 | -1.10 | -1.35 |
| 2008 | 06 | 32 | -1.75 | -2.00 |
| 2008 | 07 | 32 | 1.14 | 0.89 |
| 2008 | 08 | 32 | 1.00 | 0.75 |
| 2008 | 09 | 32 | 1.16 | 0.91 |
| 2008 | 10 | 32 | (0.76) | -1.01 |
| 2008 | 11 | 32 | 0.10 | -0.15 |
| 2008 | 12 | 32 | (1.65) | -1.9 |
| 2008 Average | | | -0.06833333 | -0.31833333 |

*FIG. 5C*

| Year | Month | Order Number | Producer Price Differential ($ per cwt.) | County Adjustment |
|---|---|---|---|---|
| 2009 | 01 | 32 | 1.71 | 1.46 |
| 2009 | 02 | 32 | 1.07 | 0.82 |
| 2009 | 03 | 32 | 0.00 | (0.25) |
| 2009 | 04 | 32 | 0.13 | (0.12) |
| 2009 | 05 | 32 | 0.98 | 0.73 |
| 2009 | 06 | 32 | 0.73 | 0.48 |
| 2009 | 07 | 32 | 0.79 | 0.54 |
| 2009 | 08 | 32 | 0.04 | (0.21) |
| 2009 | 09 | 32 |  | (0.25) |
| 2009 | 10 | 32 |  | (0.25) |
| 2009 | 11 | 32 |  | (0.25) |
| 2009 | 12 | 32 |  | (0.25) |
| 2009 Average |  |  | 0.68125 | 0.43125 |

*FIG. 5D*

Correlation between Producer Contract Terms and Pricing with Federal Market Order Pricing for Class III

|  | Dairy Farm No. 1 | Dairy Farm No. 2 | Total Under Contract | Dairy Farm No. 1 | Dairy Farm No. 2 | Total Under Contract | FMO Price | CME Price |
|---|---|---|---|---|---|---|---|---|
| Jan-08 | $ 15.15 | $ 15.61 | $ 15.394 | $ 21.293 | $ 21.420 | $ 21.361 | $ 19.320 | $ 19.32 |
| Feb-08 | $ 15.19 | $ 15.32 | $ 15.259 | $ 18.855 | $ 18.913 | $ 18.886 | $ 17.030 | $ 17.03 |
| Mar-08 | $ 15.08 | $ 15.41 | $ 15.254 | $ 19.699 | $ 19.687 | $ 19.693 | $ 18.000 | $ 18.00 |
| Apr-08 | $ 14.99 | $ 15.37 | $ 15.193 | $ 18.220 | $ 18.224 | $ 18.222 | $ 16.760 | $ 16.76 |
| May-08 | $ 15.10 | $ 15.19 | $ 15.151 | $ 19.734 | $ 19.429 | $ 19.566 | $ 18.180 | $ 18.18 |
| Jun-08 | $ 14.94 | $ 15.05 | $ 15.002 | $ 21.691 | $ 21.119 | $ 21.377 | $ 20.250 | $ 20.25 |
| Jul-08 | $ 14.86 | $ 15.00 | $ 14.939 | $ 19.411 | $ 18.817 | $ 19.078 | $ 18.240 | $ 18.24 |
| Aug-08 | $ 14.87 | $ 14.95 | $ 14.916 | $ 18.534 | $ 17.913 | $ 18.187 | $ 17.320 | $ 17.32 |
| Sep-08 | $ 15.04 | $ 15.06 | $ 15.051 | $ 17.730 | $ 17.326 | $ 17.505 | $ 16.280 | $ 16.28 |
| Oct-08 | $ 15.16 | $ 15.21 | $ 15.191 | $ 18.733 | $ 18.426 | $ 18.568 | $ 17.060 | $ 17.06 |
| Nov-08 | $ 15.50 | $ 15.44 | $ 15.465 | $ 17.121 | $ 17.095 | $ 17.108 | $ 15.510 | $ 15.51 |
| Dec-08 | $ 15.10 | $ 15.26 | $ 15.187 | $ 16.785 | $ 16.939 | $ 16.907 | $ 15.280 | $ 15.28 |
| Jan-09 | $ 15.41 | $ 15.58 | $ 15.497 | $ 12.544 | $ 12.562 | $ 12.553 | $ 10.780 | $ 10.78 |
| Feb-09 | $ 15.29 | $ 15.30 | $ 15.294 | $ 10.916 | $ 10.854 | $ 10.883 | $ 9.310 | $ 9.31 |
| Mar-09 | $ 15.29 | $ 15.36 | $ 15.330 | $ 11.984 | $ 11.967 | $ 11.975 | $ 10.440 | $ 10.44 |
| Apr-09 | $ 15.26 | $ 15.37 | $ 15.319 | $ 12.290 | $ 12.224 | $ 12.254 | $ 10.780 | $ 10.78 |
| May-09 | $ 11.89 | $ 11.75 | $ 11.815 | $ 11.887 | $ 11.751 | $ 11.815 | $ 9.840 | $ 9.84 |
| Jun-09 | $ 12.01 | $ 11.90 | $ 11.951 | $ 12.008 | $ 11.901 | $ 11.951 | $ 9.970 | $ 9.97 |
| Jul-09 | $ 11.96 | $ 11.74 | $ 11.839 | $ 11.955 | $ 11.743 | $ 11.839 | $ 9.970 | $ 9.97 |
| Aug-09 | $ 13.29 | $ 12.97 | $ 13.113 | $ 13.293 | $ 12.967 | $ 13.113 | $ 11.200 | $ 11.20 |
| Correlation Coefficient | 0.513 | 0.549 | 0.534 | 0.998 | 0.994 | 0.996 | | |

Performance Using Old Contract Terms     Performance Using New Contract Terms

*FIG. 6*

| MAINTAIN PAY GROUP PRICES | | | | | | | | |
|---|---|---|---|---|---|---|---|---|
| COMPANY 1 DIVISION 1 PAYMENT TYPE CP PAYMENT TABLE BASE ▽ | | | | | | | | |
| ACTIVITY ACTIVE ▽ DESCRIPTION DAIRY FARM NO. 1 | | | | | | PRICE DATE MM/DD/YYYY | | |
| | | | | | | PRICE DATE MM/DD/YYYY | | |

BUTTER FAT PRICES

| PAY ON | SHOW MIN | BASE TEST | BLEND PRICE | EXCESS PRICE | PLANT PREMIUM | ZONE | DIFFERENTIAL ABOVE BASE | BELOW BASE |
|---|---|---|---|---|---|---|---|---|
| ☐ | ☐ | 0.0000 | 10.3800 | 0.0000 | 0.0000 | | 0.0000 | 0.0000 |

COMPONENT PRICES

| PAY ON | | PROD DIFF PRICE | B/F PRICE | PROTEIN PRICE | OTHER SOL PRICE | SCC RATE | SKIM PRICE | NCE BLOCK PRICE |
|---|---|---|---|---|---|---|---|---|
| ☐ | MINIMUM | 0.0000 | 1.2491 | 2.1009 | 0.0962 | 0.00063 | 0.0000 | 0.0000 |
| ☑ | PLANT | 0.0000 | 1.2491 | 2.1009 | 0.0962 | 0.00063 | 0.0000 | 0.0000 |

QUOTA, BASE, OVERBASE

| PAY ON | COMPONENT | QUOTA | BASE | OVER BASE | CL1 USE | CL1 RATE | OTHER RATE |
|---|---|---|---|---|---|---|---|
| ☐ | BUTTER FAT | 0.0000 | 0.0000 | 0.0000 | 0.0000 | .0000000 | .0000000 |
| | SOLIDS NON FAT | 0.0000 | 0.0000 | 0.0000 | 0.0000 | | |

METHOD AND SYSTEM FOR CONTRACTING PRODUCER MILK ON A CLASS III BASIS

I. CROSS-REFERENCE TO RELATED APPLICATIONS

This application claims priority under 35 U.S.C. §119 of provisional application Ser. No. 61/279,673 filed Oct. 22, 2009, herein incorporated by reference in its entirety.

II. BACKGROUND OF THE INVENTION

A. Field of the Invention

The present invention relates to managing economic risk regarding purchase from one or more suppliers of one or more components needed to produce a finished product for commercial sale. In one aspect, the invention relates to a computerized system of reducing risk relative to potentially volatile prices of components needed by a manufacturer to create finished goods for wholesale or retail sale.

B. Problems in the Art

Manufacturers of finished goods for wholesale or retail sale many times must purchase components needed to produce the finished goods from one or more suppliers. This creates economic risk for the manufacturer because the price of the components is not under direct control of the manufacturer. If the price of the components is so high that cost of production of the finished goods does not produce a profit, the manufacturer experiences economic loss.

This risk can even occur in a substantially free market. While a manufacturer can seek the lowest price for the needed components in the marketplace, sometimes the market will not bear a wholesale or retail price for the finished good that is high enough to produce a consistent profit relative to the cost of the components. Risk exists even if the price of the components change over time. Particularly in a volatile market for the component, the manufacturer may enjoy greater than normal profits when the component prices move low, but may suffer small profits or even loses on substantial price swings in the opposite direction.

These types of risk can exist even in more regulated markets. The market for components needed to manufacture ice cream as a finished product in the United States is one example.

A major component of ice cream is milk. The milk market in the United States is an example of a government regulated market.

For example, the government sets the minimum blend price that a milk handler must pay to a milk producer. The blend price is calculated using the Class prices, which are set by the National Agricultural Statistics Service (NASS) and created by surveying the wholesale prices for the finished products that are represented by each Class.

Specifically, there are four classes of milk component buyers, sometimes called classes of milk handlers:

Class I buyer/handler—buys milk to manufacture bottled milk as a finished product (typically the most expensive wholesale prices and therefore subsequent Class prices);

Class II buyer/handler—buys milk to manufacture soft dairy products, such as sour cream, ice cream, or milk cultures as a finished product;

Class III buyer/handler—buys milk to manufacture all types of cheese, cream cheese, etc. as a finished product; and Class IV buyer/handler—buys one or more components of milk to either manufacture a finished product or sell a wholesale or retail product (e.g., powdered milk, butter) (typically the least expensive wholesale prices and therefore subsequent Class prices).

Typically Class II volumes represent a small percent of the total of sales of all four Classes, particularly in specific regions.

One conventional way to purchase milk is from a Coop or buying the partially processed components of milk (e.g., nonfat solids and fat solids in either condensed or dry form).

Another conventional way for a Class II handler to obtain milk is to go directly to milk producers (e.g., dairy farmers) and purchase milk at or as close to the minimum regulated price as possible. Risks associated with these more conventional ways include (a) uncertainty of price, especially if the price tends to fluctuate substantially, and (b) scarcity of supply or sellers. Thus, a Class II handler under this milk purchasing schema lacks the desired predictability, and a defined cash flow model. As illustrated diagrammatically in FIG. 1A, the Class II handler must locate enough producers to acquire sufficient milk quantities at a required quality or having other specifications. There can be competition between handlers in Class II for the producer's milk, as well as competition from handlers of other Classes. Furthermore, milk is an extremely perishable commodity and is not typically found in an unbalanced supply and demand situation. Therefore, each Class II handler has uncertainty as to finding sufficient milk for its finished products, as well as uncertainty of price for the milk over time. A subtle point is there is also uncertainty (i.e., volatility) for producers. Since milk is typically the subject of a reasonably balanced supply and demand situation, changes in either the supply or demand, even locally or regionally, have significant impact on price thereby creating a high level of volatility for milk prices in the market as illustrated in the plot shown in FIG. 1A. Volatility in the regulated price presents the risk that payments from handlers for the milk will not exceed the producer's cost of production for the milk.

Class II regulated milk prices do tend to be fairly volatile. FIGS. 2A-D are a compilation of data charts showing the Class II blended minimum prices on a month-to-month basis as published by the USDA Federal Milk Marketing Order Office 30 for years 1999-2009. The Class II price is determined through the application of the % utilization of milk by Class in each Federal Market Order (based on the geographical region) times the class price. The blend price is the minimum price required to be paid to producers in the geographical region by the Federal Market Order. A producer price differential (PPD) value, such as that illustrated in FIGS. 5A-D, (which is an adjustment to the Class value of the milk) is a government calculated pay price factor that is not captured in the other components that make up the producer price (i.e., protein, butterfat, and other solids prices). There can also be a published local compensation value, such as a county adjustment, that is added (or subtracted) from the blended base and PPD sum. Note how in FIGS. 2A-D that the Class prices can move several dollars one way or the other month-to-month. The largest swings are on the order of 30-40%. This is further exemplified in the rolling 13-month correlation calculations. Note that the correlation coefficient falls below regulation standards (0.85 under FASB regulations) for 65% of the time periods shown. FIGS. 2A-D further show that if a large enough correlation window is selected it appears that you are correlated, which is not the case as evidenced by the fact that the rolling 13-month basis is not sufficiently correlated. At the margins of Class II handlers, this is considered volatile.

Techniques have been tried to reduce the economic risks of Class II handlers relative to the regulated Class II prices.

One is an old and well-known risk management tool. Class II handlers can hedge against the risk of high milk prices by: Purchasing either cash settled futures or physical Class IV components at times when prices are deemed low (so that if Class II prices go up, the Class II handler can hopefully sell its futures or stockpiled Class IV components at sufficient profit to offset lowered profit because of higher Class II prices—or use the hopefully lower price stockpiled components in manufacturing its finished products).

However, there are issues with this technique. Hedging by purchase of Class IV futures or the physical components itself has uncertainty because with the class IV hedge instruments there is a lack of market liquidity—not enough market participants to create sufficient volumes to allow price discovery and efficient markets. Class IV components can be hedged with futures instruments. Non-fat solid Class IV components can alternatively be physically bought and stored, and then resold (an exception is butter fat which can be hedged with futures). If physically bought and stored, it requires the Class II handler to physically obtain possession of the Class IV components. This involves additional costs and resources. For example, purchase of physical powdered milk requires a Class II handler to become a warehouse of the physical goods. This requires appropriate storage buildings, transportation costs, maintenance costs, and the like. Also, if the Class II handler needs to sell any or all of the stockpiled goods, the handler has to find buyers and deliver the goods to them. As a result, hedging Class II in this manner is very inefficient and not the most economically viable option.

Current regulated milk pricing does not allow for a Class II handler to price its milk to its producers in another Class (e.g., at Class III prices). In addition, the government-set producer price differential involved in Class II milk pricing is a function of equalizing the regulated Federal Milk Marketing Order (FMO) pricing structure and has too much monthly variation in it to allow a regulated Class II handler to create an effective hedge in the Class III futures, thereby forcing other types of hedges to be utilized, such as those described above. The most common type of Class II hedge, as discussed above, is the purchase of physical milk powder to hedge the non-fat solids portion of milk and the purchase of cash settled butter futures or actually buying physical butter to hedge the fat solids portion of the milk. This approach requires a great deal more cash and is subject to the deterioration of quality on physical purchases, the cost of storing the physical products, and the limited ability to efficiently buy and sell physical product in the commercial markets at timing and volumes that provide the necessary liquidity.

Therefore, there has been a long need in the industry for improvement in financial risk management associated with regulated but volatile milk component prices.

Recently, the U.S. Congress passed a Farm Bill (2008) which allows all handlers except Class I to execute forward contracts with producers; once the contract is approved by the FMO, this allows pricing to the producer to fall below minimum blend prices as set by the FMO.

Current Federal Milk Market Order Pricing schemas require those who purchase milk direct from producers to pay producers according to minimum price regulations administered by the USDA Federal Milk Marketing Orders. However, a change to the 2008 Farm Bill allows handlers to avoid paying minimum regulated pricing, and modify other regulated terms if producers are willing to sign a contract and have it approved by the Federal Milk Marketing Order that oversees the handler.

However, even if a Class II handler gets suppliers to contract for prices below Class II minimums and gets the contracts approved, there remains no comprehensive system for managing economic price risk in this situation. If the price is too low, producers will not contract with the Class II handler, who may not be able to meet demand for its products. Notwithstanding, prices still tend to be tied to some government or regulated price minimums, and thus still have volatility. There is still no adequate solution for hedging against this kind of price volatility.

Complicating matters further are relatively recent regulations that pertain to speculative ventures and investments, including hedging and derivatives. Sarbanes-Oxley legislation and related standards (e.g., Financial Accounting Standards Board Statement 133) can affect whether certain business arrangements are deemed compliant with financial reporting and acceptable risk. This can affect whether lenders, regulators, or business partners deem the business arrangement within reasonable risk to proceed. Thus, a potential impediment to ways to reduce Class II handler risk in milk purchases is compliance with these types of standards. This can be especially true if hedging, especially with derivatives (e.g., futures and options), is involved.

The issues identified above do not only affect the profit margin of the Class II handler. They can affect the ability of the Class II handler to obtain and secure financial and other business relationships with third parties. Examples would be banks, financial lenders or other prospective business partners. The volatile regulated pricing may present unacceptable uncertainty and risk to potential partners, especially financial partners. By way of another example, it can affect relationships with customers or potential customers of the Class II handler, as potential customers may consider the volatility and risk position of the Class II handler to be inconsistent with its policies, needs or goals.

Therefore, these are other very real and substantial issues faced in the marketplace and in need of improvement.

While the foregoing issues are described in the context of Class II milk handler, similar issues can exist in other situations involving a buyer needing a component to manufacture a finished product. Examples include but are not limited to wheat for flour milling, livestock for meat processing, oil for refining, etc.

III. SUMMARY OF THE INVENTION

Therefore, a principle object, feature, aspect, or advantage of the present invention is to improve over the state of the art.

Another object, feature, aspect, or advantage is to provide a system and method to: Protect the process used to hedge Class II handler milk price exposure and to allow the Class II handler to control the use of the process for its customers, producers, or others who are deemed suitable to the Class II handler and are willing to compensate the Class II handler to utilize the process for their hedging requirements. In one aspect of the invention, the Class II handler will be able to offer to its customers a way to transparently hedge (or set) its milk price as a component of its finished goods cost in a fashion that is correlated in accordance to all FASB and Sarbanes Oxley financial reporting requirements, and provide a competitive advantage over others.

The system and method can be used in analogous fashions for other relationships where a buyer purchases one or more components from suppliers/producers to create a finished product with the one or more components.

Further objects, features, aspects, or advantages can include a system or method which provides one or more of:

Substantial flexibility for the buyer, as well as producers/suppliers of the buyer, customers of the buyer, and business partners of the buyer.

Reduced uncertainty and risk for any and all of those stakeholders.

Potential for benefits for all stakeholders, as opposed to a benefit to one and a detriment to others.

Transparency to all stakeholders regarding reporting requirements and speculation standards.

All stockholders have substantial control over hedging, for example in terms of price and timing according to their specific needs or desires.

In one aspect of the invention, a method is provided for managing economic risk. The method includes filling Class II handler demand for milk by forward contracting with one or more producers for physical supply of milk with the following mutually agreeable terms approved by the appropriate regulator (e.g., USDA), such that price is not constrained by regulated Class II prices but rather tied to a different Class price (e.g., Class III) with a modifier to reduce volatility so as to qualify under FASB 133 and other Sarbanes Oxley regulations.

Other terms include but are not limited to, delivery time and quality, and transportation terms, liability and indemnity terms, guarantees and warranties, etc.

Optionally, hedge risk by the Class II handler in the Class III derivatives market (options, futures, or over-the-counter swaps) handled, for example, by the Chicago Mercantile Exchange (CME).

Optionally allow a producer to also hedge risk in the Class III derivatives market.

Optionally pool forward contracted or hedged milk for any given time period.

In another aspect of the invention, a system is provided. The system includes a computer with memory medium, programming, and user interface, a forward contract between a buyer and each of a plurality of suppliers of a component needed by the buyer to manufacture finished goods (in one example the buyer is a Class II milk handler and the suppliers are milk producers), a derivative instrument between the buyer and a derivative exchange, and a payment issuing component taking instructions from the computer according to data related to terms of the forward contract. The programming on the computer adapted to determine a contract price for the component based on a market with enough liquidity to provide adequate volume to effectively offset price risk for the volume of required demand for the component (in the example of a milk market, the market is a Class III milk futures market for a Class II handler), and a calculated compensating factor to reduce volatility of that market (in the example of a milk market, the calculated compensating factor is a Modified Producer Price Differential which produces a correlated hedge within Class III pricing that meets FASB and Sarbanes Oxley regulations).

The derivative instrument taking a hedge position of the buyers choosing related to the same market as used to determine the contract price (in the example of milk market, the hedge is in Class III milk). The payment issuing component generates a payment to each producer based on the contract, and wherein financial risk to the buyer is managed by (a) reducing risk of volatility of price paid to suppliers, and (b) tying contract price to a market that provides a hedge with high correlation of successful hedging.

In a specific embodiment of one aspect of the invention related to a Class II milk handler purchasing milk to manufacture a finished product, the system and method includes the Class II handler tying forward contract milk prices with one or more producers to Class III regulated pricing, but with an Adjusted or Fixed PPD designed to reduce volatility of the regulated PPD values, and the Class II handler hedging the forward contract milk prices in the Class III derivatives market in a manner that has high correlation between forward contract prices and Class III derivatives prices.

Optionally, the Class II handler can further attempt to manage risk by choosing to pool milk during any given month to offset a portion of a spread between Class II (competitors' regulated milk price) and Class III (the forward contracted milk price).

Optionally, the Class II handler can use the correlated forward contracting and hedging to establish relationships with business partners (e.g., lenders or customers) by demonstrating high correlation between contract pricing and hedging.

The system can provide computerized record management and calculation of payments and settlements between the stakeholders.

IV. BRIEF DESCRIPTION OF THE DRAWINGS

The appended figures illustrate certain features or aspects related to examples of the invention. The figures include:

FIGS. 2A-D is a data chart illustrating volatility of recent years' Class II milk prices.

Figure 3:
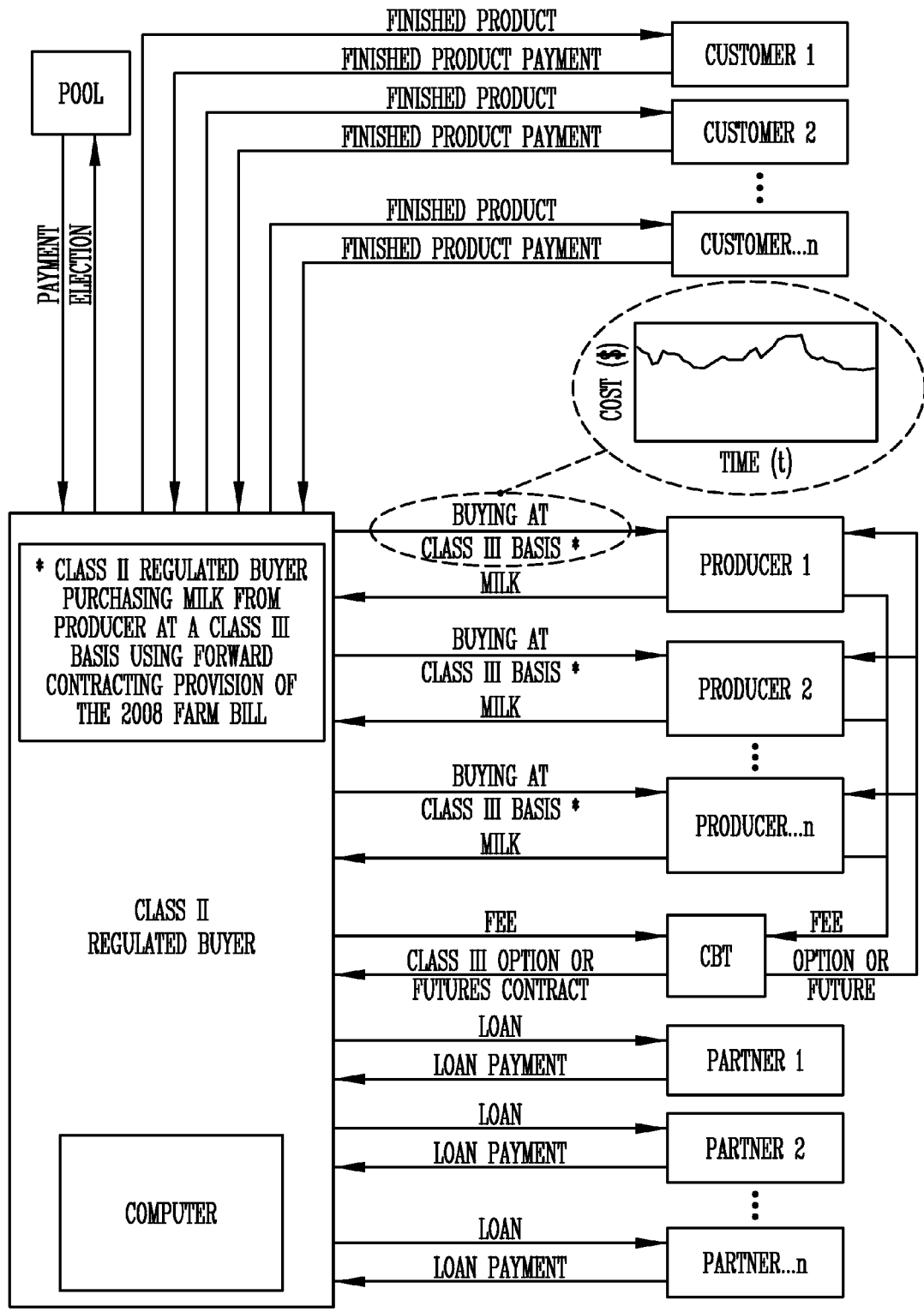

FIG. 3 is a block diagram illustrating a novel system, according to one embodiment of the present invention, for a Class II handler to purchase milk from milk producers at prices tied to Class III milk prices and to manage risk and finances.

FIGS. 4A-L is a representation of a forward contract which can be used between a Class II handler and a producer according the exemplary embodiment of the invention.

FIGS. 5A-D a chart that demonstrates an exemplary calculation method for a Fixed PPD used to calculate the contract price of FIGS. 4A-L.

FIG. 6 is a diagram illustrating a statistical validation demonstration of high correlation between the Class III indexed contract price and pricing for Class III derivatives according to an embodiment of the invention.

FIG. 7 is a computer display screen shot providing an example of data fields used for generating a payment to a producer under the forward contract of FIGS. 4A-L.

Figure 8:
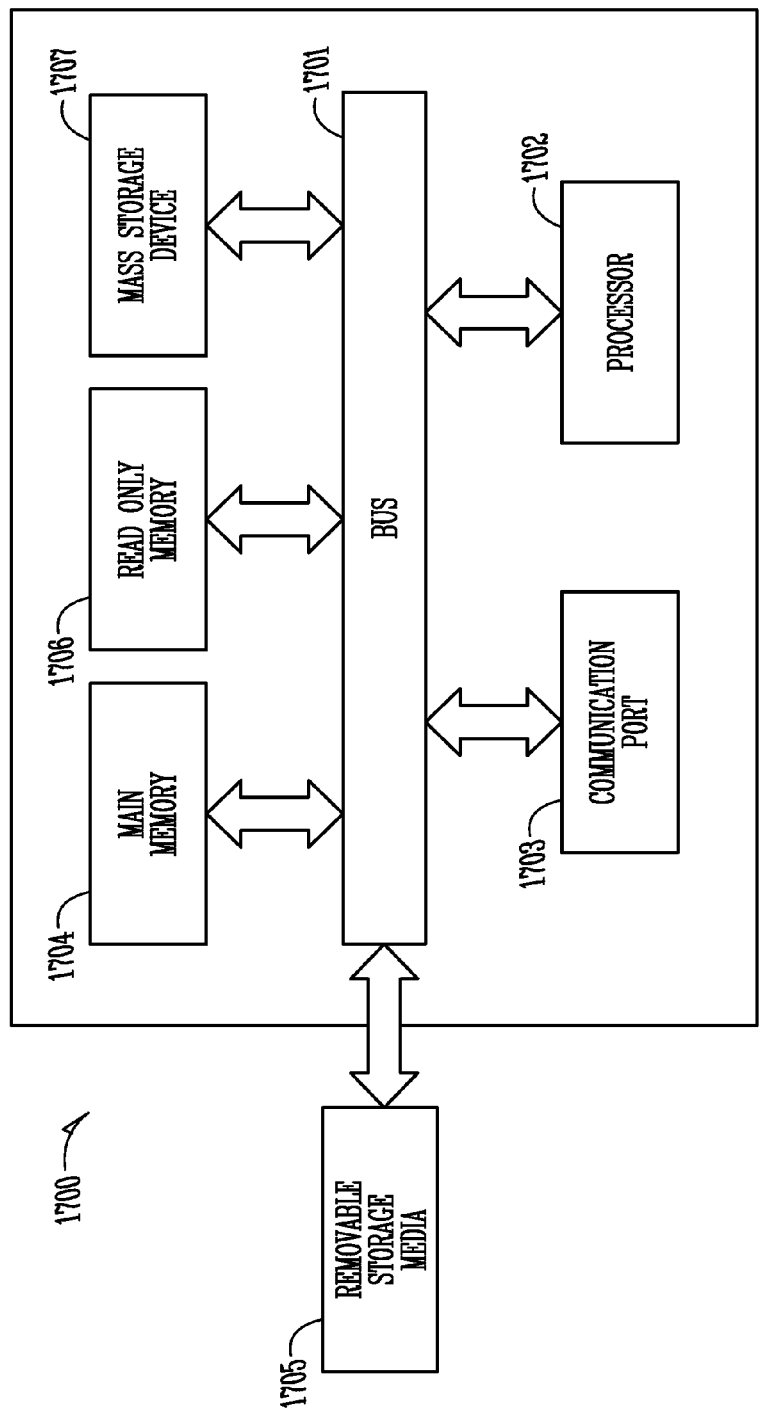

FIG. 8 is a diagram of a computer system that might be used with the system and method of the exemplary embodiment.

V. DETAILED DESCRIPTION OF EXEMPLARY EMBODIMENTS

A. Overview

For a better understanding of the invention, several examples of forms the invention can take will be described in detail. Reference will be taken from time to time to the figures listed above in the Brief Description of the Drawings.

It is to be understood that the primary example will be discussed in the context of a Class II milk handler obtaining milk from a variety of milk producers. However, variations obvious to those skilled in the art will be included in the invention, which is not necessarily limited to the precise primary exemplary embodiment. The invention can be applied in analogous ways to other buyer/seller relationships.

B. Generalized Method

In a very general sense, one aspect the invention can take form as follows.

The buyer forward contracts with one or more component producers/suppliers to reduce uncertainty as to obtaining necessary supply of components to make its finished product.

The buyer and producers/suppliers mutually agree to pricing and other terms. The contract pricing has one factor tied to a component in the market, which market price has some volatility but which also has a derivatives market with reasonable liquidity related to it. What will be called an Adjusted or Fixed Producer Price Differential (FPPD) value is used by the buyer to adjust the contract pricing. The FPPD is calculated to reduce volatility in the market price and treated as a fixed pricing term.

The buyer then hedges against the contract price with suppliers by purchasing derivatives in that derivatives market after confirming a high correlation between the contract pricing and the derivatives pricing.

In this manner, the buyer manages risk related to supply of the component, as well as price of the component. This promotes profitability, competitive advantage, and attractiveness for dealings with business partners such as lenders and customers.

The method and system does not rely on uncertainty of supply and price by simply going to the market place for the component.

Below is an application of the general method and system to a specific market.

C. Specific Example

1. Class II Milk Handler Demand for Milk for Finished Products

Figure 1A:
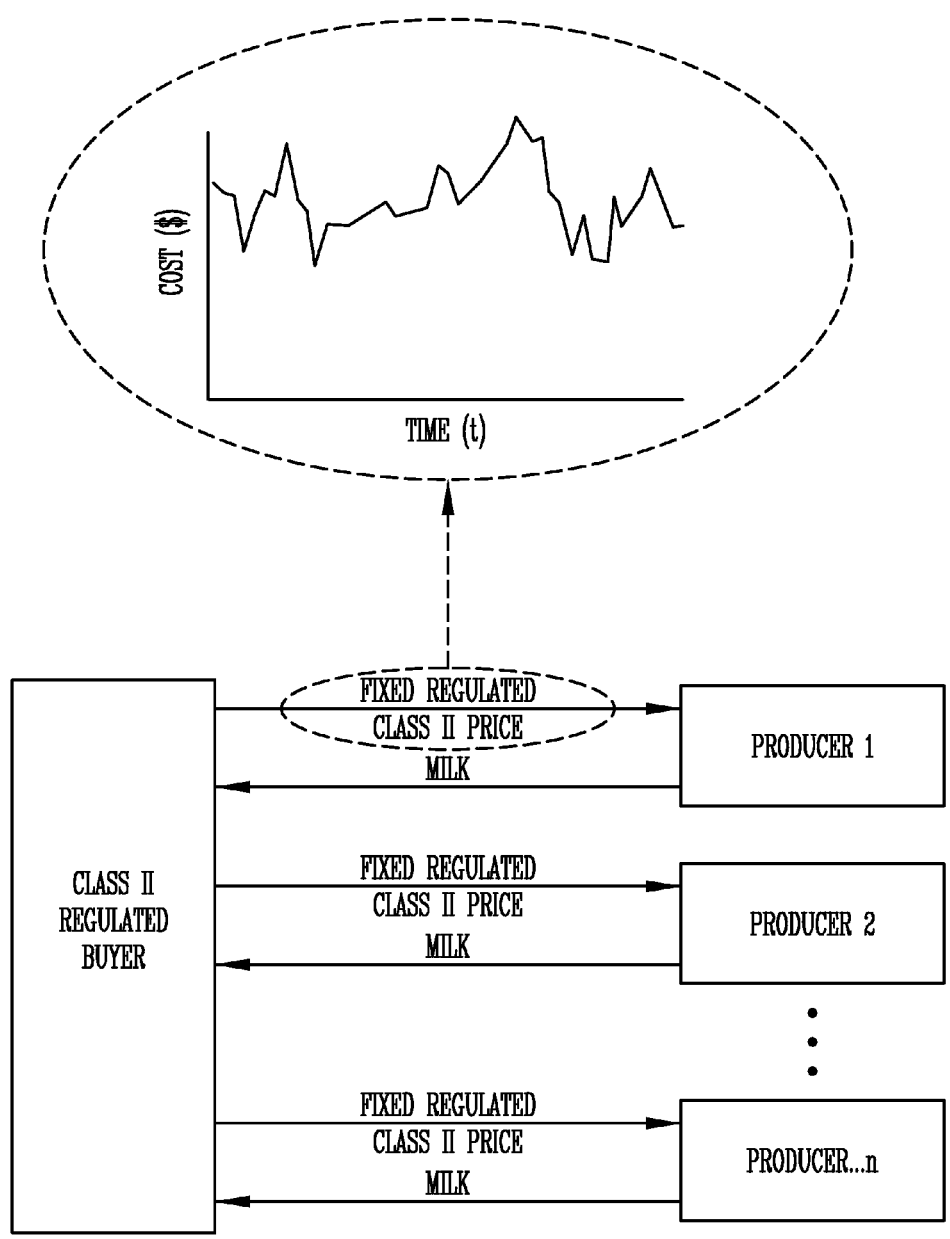
FIG. 1A is a block diagram illustrating a conventional Class II handler method of purchasing milk from milk producers at Class II prices.
Figure 1B:
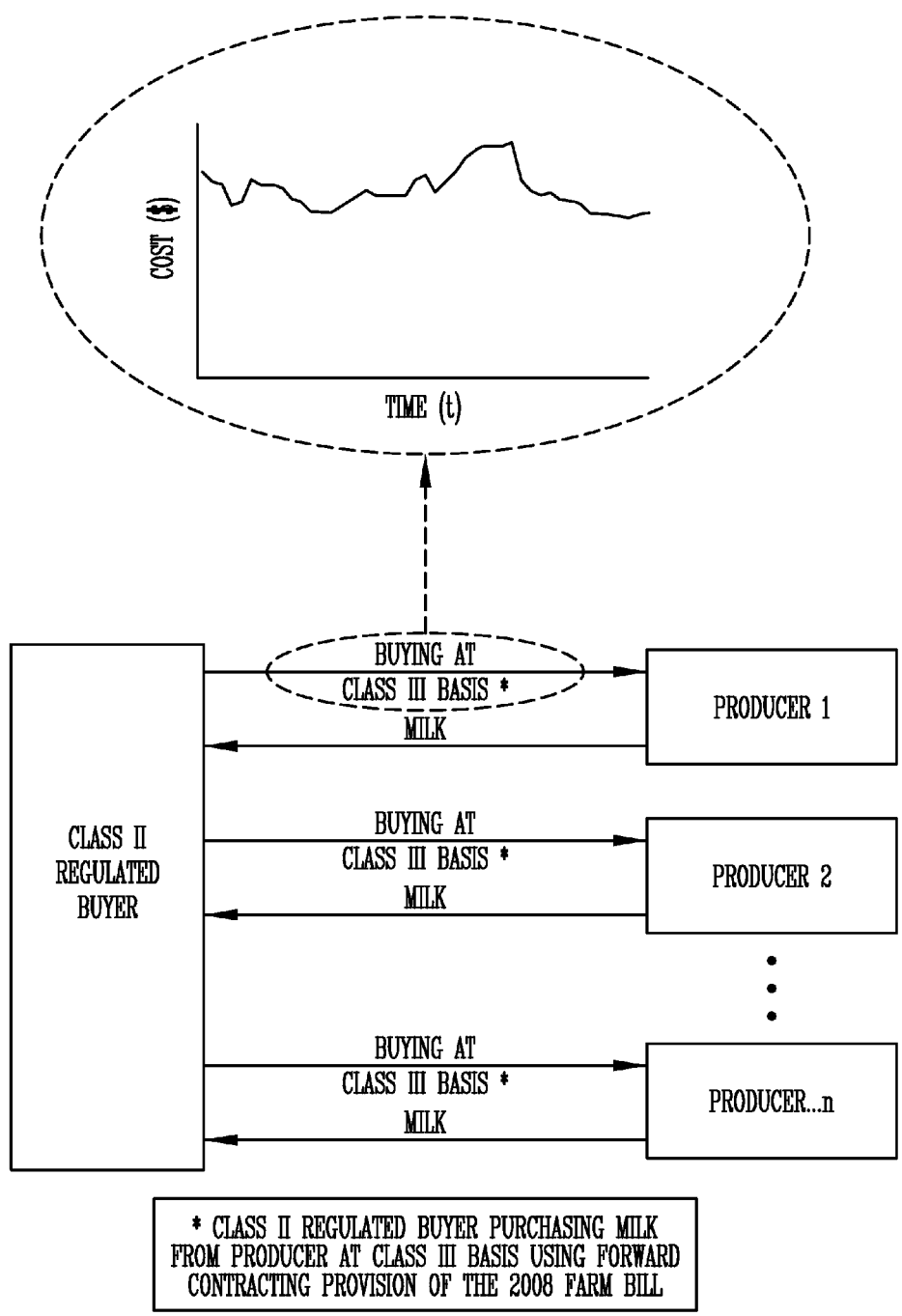
FIG. 1B is a block diagram illustrating one method of the present invention for a Class II handler to purchase milk at prices tied to Class III milk.

This embodiment relates to a method and system for a Class II handler of milk to manufacture ice cream and other Class II finished products, by acquiring milk in bulk from multiple milk producers using forward contracting as shown in FIG. 1B. The forward contracting is developed to provide a price indexed to a milk market different than Class II (indexed in this example to Class III), where the indexed price is managed by (a) adjusting it to compensate for fluctuations in the indexed price (by the FPPD) and (b) tying it to a sufficiently liquid derivatives market (here Class III derivatives and options) so that hedging by the buyer in the derivatives market is highly correlated to the indexed price, as adjusted by the FPPD. The method and system include computerized calculations of the FPPD, computerized calculations of the correlation between the indexed price and the hedging tool, computerized calculation of payments due to suppliers, and generation of the payments. The method and system further can include distribution of the finished products to customers and establishment of business relationships with business partners, based on the highly correlated forward contract pricing and hedging.

FIG. 3 illustrates diagrammatically the new paradigm of the system of this example embodiment.

The Class II regulated buyer proposes a forward contract with one or more Producers 1, 2, . . . , n. The contract would be drafted and considered by both parties, and would have to be agreed to by both parties. An exemplary forward contract is represented (with its terms, which can vary from contract to contract) at FIGS. 4A-L. As illustrated in FIGS. 1B and 3, this allows a Class II regulated buyer to purchase milk from a producer at a Class III basis using the forward contracting provisions of the 2008 Farm Bill.

2. Key Concepts of the Process

1. Physical milk contract process with producers—the process utilizes approved forward producer contracts that are designed under the forward contracting provisions of the 2008 Farm Bill. The Class II handler must submit all producer contracts to, and receive approval from, the USDA Federal Milk Marketing Order Office of Federal Milk Marketing Order number 30—Upper Midwest (as a relevant example for a handler in that region of the United States) to utilize the contracts for transacting physical milk purchases from its producers.

Current Federal Milk Market Order Pricing schemas require those who purchase milk directly from producers to pay the producers according to the minimum price regulations administered by the USDA Federal Milk Marketing Orders. However, a change to the 2008 Farm Bill allows handlers to avoid paying minimum regulated pricing, and to modify other regulated terms if producers are willing to sign a contract and have it approved by the Federal Milk Marketing Order overseeing that the handler.

2. Specific milk contracting commercial terms in the forward contracts create a unique hedging opportunity for the Class II handler along with its producers of its milk needs and customers of its finished goods. The terms of such a contract address two key issues currently outside the regulated pricing schema:

The Class II handler prices the milk to the producers at Class III pricing while being a Class II handler, thus providing the ability to hedge in a Class III futures market that is the only industry futures market with enough liquidity to provide adequate volume to effectively offset price risk for the volume of physical milk that many Class II handlers and/or its producers or customers currently utilize.

The Class II handler has created and fixed the Fixed Producer Price Differential ("FPPD) for a forward term of greater than one month within the Class III pricing schema to create a correlated hedge that meets the requirements FASB 133 and other Sarbanes Oxley regulations. This FPPD differs from the government set producer price differential ("PPD"), which is quite volatile. The FPPD is calculated, as will be discussed below, in a manner intended to reduce volatility. Importantly, such correlated hedges allow for producers to hedge their milk at the price and timing they deem appropriate for their business while, separate and apart, allowing for a customer of the Class II handler/manufacturer to hedge their pricing at the appropriate price and timing for its business. This creates a win-win pricing situation for the total business transaction that allows both the producers and the customers of the Class II handler/manufacturer to participate in setting their pricing at levels they deem the most appropriate for their business objectives or tolerances while transferring that pricing risk to the Class III futures market. This then allows for the milk portion of the cost of goods in the customer's finished product to be set for a specific period of time and for a set amount of volume.

Utilization of approved producer forward milk contracts create the ability for the Class II handler/manufacturer, at its discretion and election, to pool its producer milk, to thereby attempt to minimize any price differentials between class III and Class II pricing on a monthly basis.

3. The Forward Contract

Many of the forward contract terms would be conventional and would define the contract price.

a) The Contract Price

In one example of a contract, a "Base Price" for all milk purchased by the buyer (a Class II handler) pursuant to the contract is defined and indexed at Class III milk component prices as announced monthly by the Federal Market Administrator. Some adjustments to the Base Price are possible.

The FPPD would be defined in the contract (here called "Fixed Producer Price Differential") and, in this example, is set to a fixed amount for a first year but thereafter is set according to a calculation defined in the contract. It differs primarily from the government set PPD by using an average of PPD's for a relatively long period of time (e.g., much longer than the one month period between PPD's). In one example, the average is a simple average for each year of the PPD established by the Federal Market Administrator for Central Order No. 32 ("FMA") as announced and published monthly in the Official Announcements of Class and Producer Prices for the immediately preceding thirty-six months. In addition to the Base Price and any applicable FPPD as set forth above, an adjustment may be included ("location differential") which is set by the regulators. For example, the FPPD could by calculated by computing a rolling average for each year's PPD announced by the Market Administrator and shown as data in FIGS. 5A-D announced by the USDA's Market Administrator. This is but one way for calculating the FPPD. The point being that the PPD is fixed over a certain period of time.

Further price adjustments can be defined in the contract, for example, they can include additions to the Base Price and FPPD, here a "premium" (e.g., to entice producers), or deductions, here a delivery and freight charge.

The Contract Price is thus indexed to a different market (Class III market) than the buyer (a Class II handler), but as a built-in compensation (FPPD) reduces price volatility of Class III regulated prices.

Pursuant to 2008 Farm Bill requirements, after agreement to price and other terms by the handler and producer, such contracts are submitted to the regulators for approval. The pricing is "transparent" at least in the sense it is clearly outlined in the contract language, and thus can be fully evaluated by any supplier considering the contract.

The Contract of FIGS. 4A-L could also set out, e.g., in chart form or otherwise, the exact way payments under the contract are calculated. For example, the Base Price could be split into components (e.g., "BF" or butter fat price/lb, protein price/lb., "OTS" or other solids price/lb.). The FPPD could be shown as "Fixed PPD". The adjustments could be shown at "Premium/cwt" and "Hauling price/cwt". Other adjustments are possible. Deductions for such things as independent testing of the milk ("Dues Fees") or promotion activities (e.g., "Dairy Promotions") can be negotiated by the parties and shown in the contract. These are but a few examples, others are illustrated by the contract shown in FIGS. 4A-L, and specifically FIG. 4K.

b) The Buyer's Hedge

The Class II handler can hedge the contract price by purchase of derivatives in that same Class III milk futures market. The Class II handler can select the price and timing of the derivatives in its discretion per its business judgment and goals. The process of hedging with derivatives is well known in the art.

Using a statistical linear regression model a high correlation ($R^2$) between such Class III derivatives and the Contract Prices indexed to Class III has been established.

For example, a correlated hedge takes into consideration the milk price the handler is paying and compares it against the Class III futures the handler is using to hedge it with.

The Financial Accounting Standards Board (FASB) requires that pricing of a physical good be correlated to the pricing of the hedge tool or derivative. In practice, this has been interpreted to mean obtaining an R squared value of at least 0.85 using statistical linear regression when comparing the historical pricing points.

For example, FIG. 6 gives example numbers and the format for a computer calculated spreadsheet that can be used to confirm that the Federal Market Order Class III milk price is equal to the Chicago Mercantile Exchange (CME) settlement price for Class III milk, and those two being equal correlate to all producer contract pricing on a monthly basis at a correlation greater than 0.95 over the period of January 2008 to August 2009 (using a statistical linear regression model to calculate the correlation value).

FIG. 6 shows a high correlation coefficient between the Class III indexed forward contract prices and CME settlement price for Class III milk using the contract terms of the present invention, as opposed to the much lower correlation coefficients using contract terms known to those skilled in the art.

This high positive correlation provides a significant benefit to the Class II handler. First, it reduces risk by increasing the likelihood of successful hedging of the forward contract pricing. But, second, it can demonstrate to present and potential business partners the stability of the milk purchasing system. This can engender, expand, or otherwise support beneficial business relationships with, to name a few, lenders, customers of the finished products, and the like. Third, it provides evidence to regulators that the system is not speculative and can assist in meeting financial reporting regulations and the like. And fourth, it provides producers with a business relationship with little intrinsic volatility, insures at least profitable placement of its milk product and non-speculative forecasting of future business.

4. Computer System

The system and method of this example can be carried out on a computer system. Software (e.g., DSI—Data Specialists—Liquid Dairy software solutions—www.dataspecialists.com) can be used to allow data entry through a user interface such as a keyboard, touch screen, or other device.

FIG. 7 illustrates a graphical user interface (GUI) 100 that could be used. The Class II handler employee could pre-load the base price components, or download or otherwise obtain and populate those fields (e.g., Blend price 102; B/F Price, Protein Price, and Other Solids Price (see ref. no. 104 in FIG. 7), etc. used to create the Base Price in the Contract of FIGS. 4A-L. The user could use a manual or preferably an electronic/computer-based spreadsheet to calculate the FPPD (per FIGS. 5A-D) and enter it in GUI of FIG. 7 (see ref. no. 106 at "Prod. Diff Price"). As can be seen in FIG. 7, other factors can be input and used for calculating or performing terms of the invention. But this shows how, for each forward contract (which likely will differ somewhat from each other), a template like FIG. 7 can be used to guide data entry such that the program can automatically calculate payments under contract to a supplier. By any number of presently available means, the payments can be sent to the producers (automatically printing physical checks, electronic wire transfer, automatic deposit, etc.).

Similarly, the Class II handler can use a computerized system to purchase futures or options. Alternatively a broker or other intermediary could be used.

As can be appreciated, the computer system can be configured according to need or desire.

a) Hardware or Machine Executable Instructions

Embodiments of the present invention include various steps that may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 8 is an example of a computer system 1700 with which embodiments of the present invention may be utilized. According to the present example, the computer system includes a bus 1701, at least one processor 1702, at least one communication port 1703, a main memory 1704, a removable storage media 1705, a read only memory 1706, and a mass storage 1707.

Processor(s) 1702 can be any known processor, such as, but not limited to, an Intel® Itanium® or Itanium 2® processor(s), or AMD® Opteron® or Athlon MP® processor(s), or Motorola® lines of processors. Communication port(s) 1703 can be any of an RS-232 port for use with a modem based dialup connection, a 10/100 Ethernet port, or a Gigabit port using copper or fiber. Communication port(s) 1703 may be chosen depending on a network such a Local Area Network (LAN), Wide Area Network (WAN), or any network to which the computer system 1700 connects.

Main memory 1704 can be Random Access Memory (RAM), or any other dynamic storage device(s) commonly known in the art. Read only memory 1706 can be any static storage device(s) such as Programmable Read Only Memory (PROM) chips for storing static information such as instructions for processor 1702.

Mass storage 1707 can be used to store information and instructions. For example, hard disks such as the Adaptec® family of SCSI drives, an optical disc, an array of disks such as RAID, such as the Adaptec family of RAID drives, or any other mass storage devices may be used.

Bus 1701 communicatively couples processor(s) 1702 with the other memory, storage and communication blocks. Bus 1701 can be a PCI/PCI-X or SCSI based system bus depending on the storage devices used.

Removable storage media 1705 can be any kind of external hard-drives, floppy drives, IOMEGA® Zip Drives, Compact Disc—Read Only Memory (CD-ROM), Compact Disc—Re-Writable (CD-RW), Digital Video Disk—Read Only Memory (DVD-ROM).

The components described above are meant to exemplify some types of possibilities. In no way should the aforementioned examples limit the scope of the invention, as they are only exemplary embodiments.

b) Options

The above method and system present opportunities for additional benefits. One is for producers. The producers have substantial flexibility in selecting not only contract terms (if agreeable to the handler), but also in reducing uncertainty about finding an outlet for their milk. The transparency of the pricing also engenders opportunities, if desired, for the producers to hedge the contract price they agreed to in a similar fashion to the Class II handler, i.e., the producers could hedge in Class III milk components also.

Another is for the Class II handler. By having the forward contracts, with the price stabilization and the correlated hedging, financial risk is managed, but optional, the handler can also, on a month-by-month basis, decide in its sole discretion, whether to pool its contracted milk or not. Pooling is well-known in the art and allows the handler to try to minimize any price differentials between class III and Class II pricing on a monthly basis.

c) Summary of Exemplary Embodiment

As can be seen by the foregoing description, a system and method for purchasing milk by a manufacturer of Class II finished products achieves at least all of the stated objectives of the invention. By indexing forward contracts to a different Class market (Class III) which has a sufficiently robust and liquid derivatives market, and validating a high correlation between the indexed Class III pricing and the hedging, and additionally compensating for indexed Class III pricing, the system and method provides opportunities for controlled yet flexible management of financial risk in the purchase of bulk milk components.

5. Methodology of Preparing Contract Terms—Steps

Below is a description of steps to prepare the forward contract.

a) Step 1

Determine if the desired business component is able to pass the test of being a hedgeable risk price;
Does the hedging tool being applied to purchase the desired business component add risk to or take away risk from the business;
In the case of a milk handler, determine if hedging Class II milk with Class III derivates adds risk or takes away risk from the business; and
Qualify with 2008 Farm Bill requirements and FASB and other Sarbanes-Oxley provisions regarding financial reporting, speculation and hedging.

b) Step 2

Create a new producer forward contract with conventional terms being adjusted and/or fixed over a period of time that provides a price risk that's highly correlated;
Submit and obtain approval of new producer forward contract with conventional provisions from appropriate government agencies overseeing milk purchasing contracts; and,
Correlate pricing between risk of Class II milk prices and Class III derivatives.

c) Step 3

Get mutual agreement to forward contract terms with appropriate number of existing or new producers;

Structure the agreement to forward contract in a way that drives correlation to the derivatives being hedged and does not add risk to the business; and Address pricing and timing for the handler, each producer, and handler's partners.

d) Step 4

Submit contracts to the USDA for approval to get forward contracting treatment under the Farm Bill.

e) Step 5

Perform forward risk management analysis;
Apply analysis to both handler and producers; and
Set hedges in class III milk futures and options at the Chicago Mercantile Exchange or by over-the-counter (OTC) swaps.

f) Step 6

Settlement of hedges;
Net out derivatives; and
Generate payment to producer for physical milk product.

g) Step 7

Pooling;
Instruct pooling partner if it's decided that the business should pool to offset differences in Class II and III pricing;
Send Federal Order in with a listing of all milk purchases for the month;
Calculate difference between Class II and III milk prices; and
Use cash draw from the pool to offset difference between Class II and III milk prices.

D. Alternatives/Options

The present invention provides novel systems, methods and arrangements for such risk management. The components described above are meant to exemplify some types of possibilities. In no way should the aforementioned examples limit the scope of the invention, as they are only exemplary embodiments. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the description, together with all equivalents thereof.

What is claimed is:

1. A method for a buyer to manage economic risk regarding purchase from suppliers of one or more components to produce a finished product for commercial sale comprising:

a. providing a computer configured to determine a contract price for the one or more components of the finished product based on a calculated compensating factor for reducing volatility of a market providing adequate volume to offset price risk for the one or more components of the finished product;

b. executing a forward contract indexed on a regulated pricing schema for the one or more components outside the regulated class of the buyer between the buyer and one or more suppliers for supply of at least one of the components to the buyer according to mutually agreeable terms which include contract pricing having:
      i. at least one factor tied to the market of the component, wherein market pricing of the component:
         1. has some volatility; but
         2. has a reasonably liquid derivatives market related to it;
      ii. a compensation factor to adjust the contract pricing to reduce volatility in the market price;

c. hedging by the buyer against the contract pricing by purchasing derivatives in the derivatives market after confirming a high correlation between the contract pricing and the derivatives pricing according to the compensation factor calculated by the computer.

2. The method of claim 1 wherein the component is a milk component, the buyer is a Class II milk handler, and the suppliers are milk producers.

3. The method of claim 2 wherein the market pricing is indexed to Class III milk prices and the compensation factor is a Fixed Producer Price Differential relative to Class III milk prices.

4. The method of claim 3 wherein the Fixed Producer Price Differential is determined by an average of regulated producer price differentials for substantially longer than a one month period of time.

5. The method of claim 1 wherein the hedging is in Class III milk features.

6. A system for a buyer to manage economic risk regarding purchase from suppliers of one or more components to produce a finished product for commercial sale comprising:

a. a computer with memory medium, programming, and user interface;

b. a forward contract indexed on a regulated pricing schema for the one or more perishable components outside the regulated class of the buyer between the buyer and a plurality of suppliers of a perishable component needed by the buyer to manufacture a finished good;

c. a derivative instrument between the buyer and a derivative exchange;

d. a payment issuing component taking instructions from the computer according to data related to terms of the forward contract;

e. the programming on the computer configured to:
      i. determine a contract price for the perishable component based on:
         1. a market with enough liquidity to provide adequate volume to effectively offset price risk for a volume of required demand for the component;
         2. a calculated compensating factor to reduce volatility of the market;

f. the derivative instrument taking a hedge position of the buyers choosing related to the same market as used to determine the contract price;

g. the payment issuing component generating a payment to each supplier based on the contract; and h. wherein financial risk to the buyer is managed by (a) reducing risk of volatility of price paid to suppliers, (b)

tying the contract price to the market that provides a hedge with a high correlation between the contract price and the hedge.

7. The system of claim 6 wherein the perishable component is a milk component, the suppliers are milk producers, the market is Class III milk market for a Class II milk handler, and the buyer is a Class II milk handler purchasing milk from the supplier to manufacture a finished product.

8. The system of claim 7 wherein:
   a. the Class II milk handler ties or indexes forward contract milk prices with one or more producers to Class III regulated pricing, but with an Adjusted PPD designed to reduce volatility of the regulated PPD values; and
   b. the Class II milk handler hedges the forward contract milk prices in a Class III derivatives market in a manner that has a high correlation between the forward contract milk prices and Class III derivatives prices.

9. The system of claim 6 wherein the calculated compensating factor is a Modified Producer Price Different which produces a correlated hedge within Class III milk pricing.

10. The system of claim 7 wherein the Class II milk handler can manage risk by choosing to pool milk during any given month to offset any spread between Class II (competitors regulated milk price) and Class III (the forward contracted milk price).

11. The system of claim 7 wherein the Class II milk handler uses the correlated forward contract and the hedge to establish relationships with business partners using the high correlation between the forward contract milk prices and the hedge.

12. The system of claim 7 wherein the computer provides computerized record management and calculation of payments and settlements between stakeholders of the forward contract.

13. A method for a Class II milk handler to manage economic risk regarding purchase of a milk component from one or more milk producers to produce a finished product for commercial sale comprising:
   a. providing a software system executed on a computer for determining a contract price for one or more milk producers for producing a finished product based on a calculated compensating factor for reducing volatility of a market having sufficient volume to offset price risk for the one or more components of the finished product;
   b. executing a forward milk purchasing contract between the Class II milk handler and the one or more milk producers according to mutually agreeable terms which include contract pricing having:
      i. the compensating factor tied to a market of the milk component, wherein market pricing of the milk component is indexed to Class III milk prices using the software system executed on the computer;
      ii. a Fixed Producer Price Different calculated by the software system executed on the computer using regulated producer price differentials for substantially longer than one month to adjust the contract pricing to reduce volatility in the market pricing;
   c. hedging by the Class II milk handler against the contract price by purchasing Class III milk features in a Class III derivatives market after confirming a high correlation between the contract pricing and the Class III derivatives pricing using the software system on the computer.

14. The method of claim 13 wherein the high correlation using statistical linear regression is at least 0.85.

15. The method of claim 13 further comprising a payment issuing component taking instructions from a computer according to the mutually agreeable terms and generating a payment to each milk producer based on the forward milk purchasing contract.

16. A system for a buyer of milk product to manage economic risk associated with the purchase of one or more components of milk from a milk producer to produce a frozen dairy product for commercial sale comprising:
   a. a software system executed on a computer;
   b. a forward contract setting forth terms of agreement between a Class II milk handler and milk producer, the forward contract being executed between the Class II milk handler and the milk producer to acquire a milk component to manufacture a frozen dairy product;
   c. a derivative instrument held between the Class II milk handler and a derivative exchange;
   d. a contract price for the milk component based on a Class III milk market for the Class II milk handler having sufficient liquidity and volume to effectively offset any price risk associated with an acquisition of a volume of the component adequate to meet demand;
   e. the contract price calculated by the software system or the completer based on a Modified Producer Price Differential having a correlated hedged with a Class III milk price, the Modified Producer Price Differential calculated;
   f. a hedge position acquired by the derivative instrument held by the Class II milk handler, the derivative instrument being correlated to the Class III milk market for the Class II milk handler and the forward contract milk prices to determine the contract price;
   g. a payment based on the contract price issued to the milk producer by execution of the software on the computer;
   h. wherein financial risk to the Class II milk handler is managed by reducing risk of volatility of the contract price paid to the milk producer and tying the contract price to the Class III milk market for the Class II milk handler that provides the hedge with a high correlation between the contract price and the hedge calculated by the software executed on the computer system.

* * * * *